United States Patent
Chatterjee et al.

(10) Patent No.: US 11,087,094 B2
(45) Date of Patent: Aug. 10, 2021

(54) SYSTEM AND METHOD FOR GENERATION OF CONVERSATION GRAPHS

(71) Applicant: Accenture Global Solutions Limited, Dublin (IE)

(72) Inventors: Ajay Chatterjee, Bangalore (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 197 days.

(21) Appl. No.: 16/588,291

(22) Filed: Sep. 30, 2019

(65) Prior Publication Data

US 2021/0097140 A1    Apr. 1, 2021

(51) Int. Cl.
*G06F 40/00* (2020.01)
*G06F 40/35* (2020.01)
(Continued)

(52) U.S. Cl.
CPC .......... *G06F 40/35* (2020.01); *G06F 16/3329* (2019.01); *G06F 16/9024* (2019.01); *G06N 3/049* (2013.01); *H04L 51/02* (2013.01)

(58) Field of Classification Search
CPC .. G06F 11/3438; G06F 40/35; G06F 16/3329; G06F 40/289; G06F 16/35; G06F 16/367; G06F 16/9024; G06F 16/90332; G06F 40/205; G06F 40/30; G06F 40/56; G06N 20/00; G06N 3/006; G06N 5/02; G06N 5/04; G06N 3/0454; G06N 3/082; G06N 5/022; G06N 5/027; G06N 5/045; G06N 5/042; G10L 2015/0633; G10L 2015/0631; G10L 2015/0638; G10L 15/00; G10L 15/16; G10L 15/18; G10L 15/1815; G10L 15/1822; G10L 15/19; G10L 15/22; G10L 15/222; G10L 2015/221; G10L 2015/225; G10L 2015/223; G10L 17/04;
(Continued)

(56) References Cited

U.S. PATENT DOCUMENTS 9,189,742 B2 * 11/2015 London ................... G06N 5/04
10,484,313 B1 * 11/2019 Sutherland ............ G06F 3/0488
(Continued)

OTHER PUBLICATIONS

Khatri, C., Hedayatnia, B., Venkatesh, A., Nunn, J., Pan, Y., Liu, Q., . . . & Prasad, R. (2018). Advancing the state of the art in open domain dialog systems through the alexa prize. arXiv preprint arXiv:1812.10757. (Year: 2018).*
(Continued)

*Primary Examiner* — Edgar X Guerra-Erazo
(74) *Attorney, Agent, or Firm* — Plumsea Law Group, LLC

(57) ABSTRACT

A system and method for generating a conversation graph for a group of related conversations is disclosed. The system and method use an iterative process of clustering multiple conversations into labeled clusters having similar user intents. The labeled clusters may be used to train a virtual agent to classify the conversational intent of a conversation. Utterances by the agent and/or customer in each conversation from a group of conversations about a similar task or goal can be processed and the dialogue categorized. The resultant classifications are used to represent the many conversations in a single graph by a plurality of nodes interconnected by transitional paths that indicate the conversation flow.

20 Claims, 10 Drawing Sheets

(51) Int. Cl.
*G06F 16/332* (2019.01)
*G06N 3/04* (2006.01)
*G06F 16/901* (2019.01)
*H04L 12/58* (2006.01)

(58) Field of Classification Search
CPC ......... G10L 17/02; G10L 17/18; G10L 17/20; G10L 17/22
See application file for complete search history.

(56) References Cited

U.S. PATENT DOCUMENTS

| | | | | |
|---|---|---|---|---|
| 10,503,834 | B2* | 12/2019 | Bachrach | G06F 40/284 |
| 10,546,586 | B2* | 1/2020 | O'Connor | G10L 15/25 |
| 10,565,509 | B2* | 2/2020 | London | G06Q 10/10 |
| 10,783,877 | B2* | 9/2020 | Solanki | G10L 15/22 |
| 10,891,950 | B2* | 1/2021 | Huang | G06F 16/9024 |
| 2014/0250195 | A1* | 9/2014 | Capper | H04L 51/02 709/206 |
| 2015/0142704 | A1* | 5/2015 | London | G06F 40/58 706/11 |
| 2016/0117593 | A1* | 4/2016 | London | G06F 40/58 706/11 |
| 2016/0162474 | A1* | 6/2016 | Agarwal | G06F 40/35 704/9 |
| 2017/0118336 | A1* | 4/2017 | Tapuhi | H04M 3/4938 |
| 2018/0196796 | A1* | 7/2018 | Wu | G06F 40/289 |
| 2018/0322880 | A1* | 11/2018 | Vuskovic | G06F 40/35 |
| 2020/0074322 | A1* | 3/2020 | Chungapalli | G06K 9/6296 |

OTHER PUBLICATIONS

Xiong, W., Hoang, T., & Wang, W. Y. (2017). Deeppath: A reinforcement learning method for knowledge graph reasoning. arXiv preprint arXiv:1707.06690. (Year: 2017).*

Chen, H., Liu, X., Yin, D., & Tang, J. (2017). A survey on dialogue systems: Recent advances and new frontiers. Acm Sigkdd Explorations Newsletter, 19(2), 25-35. (Year: 2017).*

Kensho Derived Wikimedia Dataset; Kensho R&D; https://www.kaggle.com/kenshoresearch/kensho-derived-wikimedia-data [accessed on Aug. 26, 2020] (6 pp).

Yago; https://github.com/yago-naga/yago3 [accessed on Aug. 26, 2020] (10 pp).

* cited by examiner

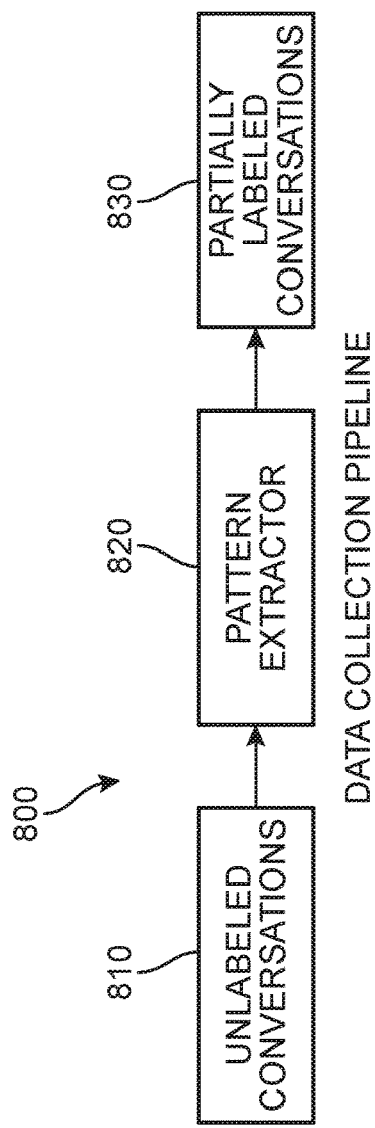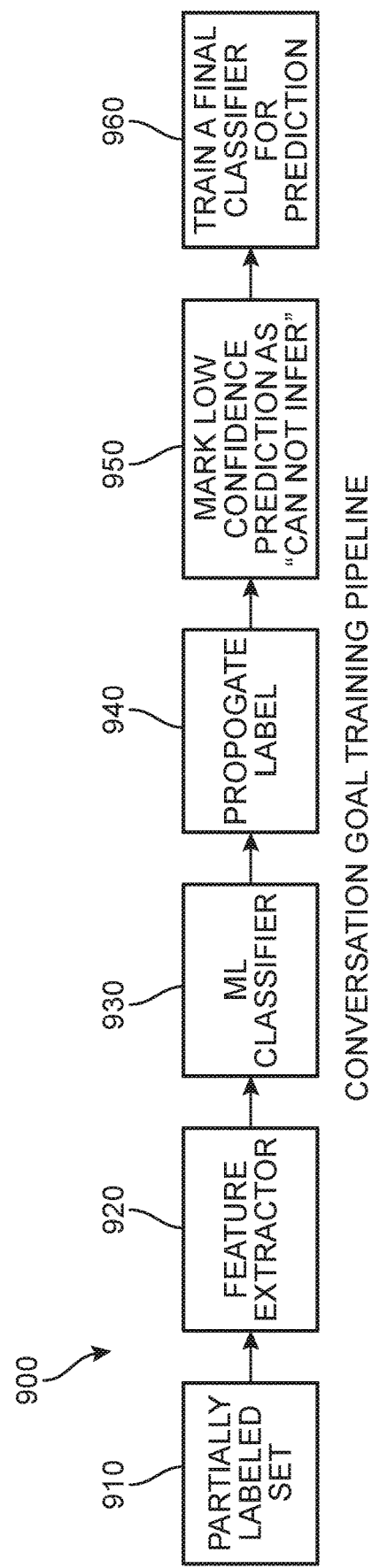

NEURAL NETWORK ARCHITECTURE FOR CONVERSATION GRAPH INFERENCE

SYSTEM AND METHOD FOR GENERATION OF CONVERSATION GRAPHS

TECHNICAL FIELD

The present disclosure generally relates to the generation of conversation graphs. More specifically, the present disclosure generally relates to a system and method for processing the utterances in conversations associated with a specific task and representing the resultant knowledge in the form of a conversation graph.

BACKGROUND

Natural language understanding systems interpret the word sequences of user utterances. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks (also referred to herein as "goals" or "intents") include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user. However, the available systems are not able to effectively access or make use of the wealth of knowledge that may be provided by the speech content and strategies and/or solutions that were identified in previous conversations for similar tasks.

There is a need in the art for a system and method that addresses the shortcomings discussed above.

SUMMARY

A system and method for the automated generation of a conversation graph representing a collection of conversations about a particular topic is disclosed. The system and method solve the problems discussed above by assigning various word sequences that correspond to utterances by an agent addressing a similar query or resolution to a single conversation node. These nodes are interconnected by transitional paths representing utterances by a customer occurring in response to the agent utterances. By taking advantage of spoken language understanding systems and dialogue act category classification methods, a conversation graph can be automatically generated. Such a graph offers a simplified yet comprehensive view of a knowledge base that would otherwise remain a dense and complex collection of data. Furthermore, the conversation graph can improve the performance of virtual and human agents in subsequent real-time conversations with customers, as well as inform the processing of other functions, such as automated conversations and process tree generation. In some cases, by reference to a conversation graph, a subsequent conversation can be automated without requiring a task to be defined beforehand. This can decrease the response time of the chatbot, as well as the associated burden on live agents. Additionally, a conversation graph and its applications can reduce computational resources (and/or computation time) by reducing the effort needed to evaluate a database of knowledge about a specific task. These resource and time savings may be significant when the knowledge base being searched is sufficiently large.

A system and method for generating a conversation graph to present information about a plurality of conversations with similar intents is disclosed. In one aspect, the disclosure provides a method of generating a conversation graph for representation of a task. The method includes receiving a set of conversations and related meta data, where each conversation includes a plurality of word sequences that each comprise a plurality of words, and each word sequence corresponding to an utterance by either an agent or a user. The method further includes determining that one or more conversations of the set of conversations are associated with a first task, and then extracting the one or more conversations associated with the first task from the set of conversations as a first subset. In addition, the method includes obtaining a dialogue act category for each word sequence associated with an agent, a user, or a combination of both in each conversation of the first subset based on a type of communication expressed by the word sequence, and extracting those word sequences classified under a first dialogue act category from the first subset as a first sequence set. Furthermore, the method includes extracting those word sequences classified under a second dialogue act category from the first subset as a second sequence set, and obtaining a slot name for each word sequence in both the first sequence set and the second sequence set based on a semantic content of the word sequence. The method then includes generating a conversation graph for the first subset of conversations. The conversation graph includes a plurality of nodes interconnected by a series of transitional paths, the plurality of nodes including a first node group and a second node group. Each node of the first node group represents each collection of word sequences that were assigned the same slot name in the first sequence set, and each node of the second node group represents each collection of word sequences that were assigned the same slot name in the second sequence set.

In another aspect, the disclosure provides a system for generating a graph representing information about a group of related conversations, and includes a processor and machine-readable media including instructions which, when executed by the processor, cause the processor to receive a set of conversations and related meta data, where each conversation includes a plurality of word sequences that each comprise a plurality of words, and each word sequence corresponding to an utterance by either an agent or a user. The instructions further cause the processor to determine that one or more conversations of the set of conversations are associated with a first task, and to extract the one or more conversations associated with the first task from the set of conversations as a first subset. In addition, the instructions cause the processor to obtain a dialogue act category for each word sequence associated with an agent, a user, or a combination of both in each conversation of the first subset based on a type of communication expressed by the word sequence, and then extract those word sequences classified under a first dialogue act category from the first subset as a first sequence set. The instructions also cause the processor to extract those word sequences classified under a second dialogue act category from the first subset as a second sequence set and to obtain a slot name for each word sequence in both the first sequence set and the second sequence set based on a semantic content of the word sequence. Furthermore, the instructions cause the processor to generate a conversation graph for the first subset of conversations, where the conversation graph includes a plurality of nodes interconnected by a series of transitional paths. The plurality of nodes includes a first node group and a second node group, where each node of the first node group represents each collection of word sequences that were assigned the same slot name in the first sequence set, and each node of the second node group represents each collection of word sequences that were assigned the same slot name in the second sequence set.

In another aspect, the disclosure provides a system that includes one or more computers and one or more storage devices storing instructions that are operable, when executed by the one or more computers, to cause the one or more computers to receive a set of conversations and related meta data. Each conversation includes a plurality of word sequences that each comprise a plurality of words, and each word sequence corresponds to an utterance by either an agent or a user. The instructions also cause the one or more computers to determine that one or more conversations of the set of conversations are associated with a first task, and to extract the one or more conversations associated with the first task from the set of conversations as a first subset. Furthermore, the instructions cause the one or more computers to obtain a dialogue act category for each word sequence associated with an agent, a user, or a combination of both, in each conversation of the first subset based on a type of communication expressed by the word sequence, and to extract those word sequences classified under a first dialogue act category from the first subset as a first sequence set. The instructions also cause the one or more computers to extract those word sequences classified under a second dialogue act category from the first subset as a second sequence set, and to obtain a slot name for each word sequence in both the first sequence set and the second sequence set based on a semantic content of the word sequence. In addition, the instructions cause the one or more computers to generate a conversation graph for the first subset of conversations. The conversation graph includes a plurality of nodes interconnected by a series of transitional paths. The plurality of nodes include a first node group and a second node group, and each node of the first node group represents each collection of word sequences that were assigned the same slot name in the first sequence set, and each node of the second node group represents each collection of word sequences that were assigned the same slot name in the second sequence set.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is a flow diagram of data collection for conversational goal tracking, according to an embodiment;

FIG. 9 is a flow diagram of a conversation goal tracking pipeline, according to an embodiment;

DESCRIPTION OF EMBODIMENTS

Conversation systems such as those providing virtual chatbots are being increasingly relied on by businesses and organizations to increase customer engagement and provide support. In order to bolster these automated virtual agents, it is important to offer more reliable and robust data resources for the virtual agents to rely on as they attempt to generate meaningful dialogues with customers that can promote successful outcomes. Toward this end, a great deal of information may be collected from past chat logs or conversations that can be used to improve future conversations. However, to ensure such information is useful and usable, the information must be organized and accessible in a format that is defined and recognizable, allowing the knowledge to be readily applicable to different scenarios.

As will be discussed in detail below, a conversation graph may be provided that captures the salient knowledge about a particular task. The general intent or task associated with previous conversations between a customer and an agent can be determined and used to separate different groups or collections of conversations. The utterances by the user and agent in each conversation within a group may be isolated as individual word sequences. A dialogue act category describing the type of expression being conveyed by each word sequence (e.g., question, command, information, etc.) may be obtained, as well as a summary or identification of the specific intent or task associated with that word sequence (referred to herein as a slot name). A "node" in the graph can be extracted that represents the collection of word sequences that fall in the same dialogue act category and the same slot name. In other words, a node will represent similar utterances (e.g., utterances directed toward the same resolution and/or providing similar information) by different agent instances or customers across different conversations. Based on these classifications, the system can be configured to generate and present a conversation graph comprising a plurality of these nodes. In addition, the nodes will be connected to other nodes by an "edge" line, also referred to herein as a transitional path or transitional edge. For example, a first node will be connected to a second node by a transitional path. The transitional path represents one or more instances where a particular utterance associated with the first node was followed by a particular utterance associated with the second node in a conversation, thereby depicting a dialogue sequence corresponding to a portion of the conversation. Thus, the conversation graphs can convey in a single illustration a large collection of utterances from a set of conversations about a similar topic as well as the subsequent utterances that were provided in the conversation sequence, as well as the frequency with which such sequences occurred.

Figure 1:
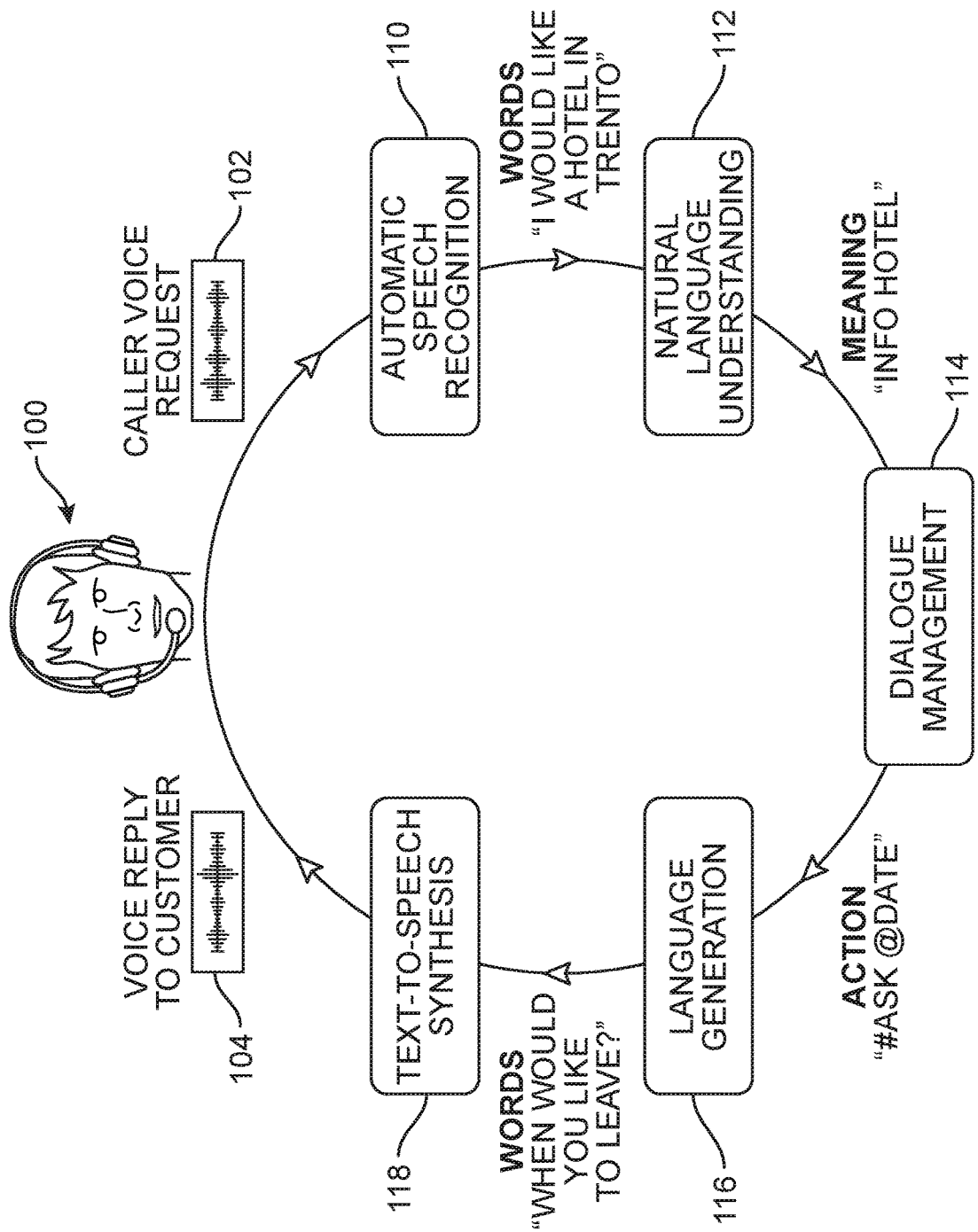
FIG. 1 is a schematic diagram of an embodiment of a virtual agent in a correspondence with a customer.

In some embodiments, the disclosed system and method may be part of a natural language understanding system or a spoken language understanding system. Furthermore, in some embodiments, the natural language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a natural language understanding system 112.

The goal of natural language understanding system 112 is to extract the meaning of the string of words passed on from speech recognition system 110. For example, natural language understanding system 112 may analyze the phrase "I would like a hotel in Trento" and determine that the customer is looking for information about a hotel. More specifically, in some embodiments, the natural language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of natural language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

The goal of dialogue management system 114 is to track the current state of the dialogue between virtual agent 100 and the customer and to respond to the request in a conversational manner. Dialogue management system 114 generates an action based on the information received from natural language understanding system 112, as well as the state of the dialogue with the customer.

The action immediately output by dialogue management system 114 may be symbolic in nature (e.g., "#ask @date"). This symbolic output is then converted into a natural language response by a language generation system 116. For example, language generation system 116 may receive input from dialogue management system 114 (e.g., "#ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
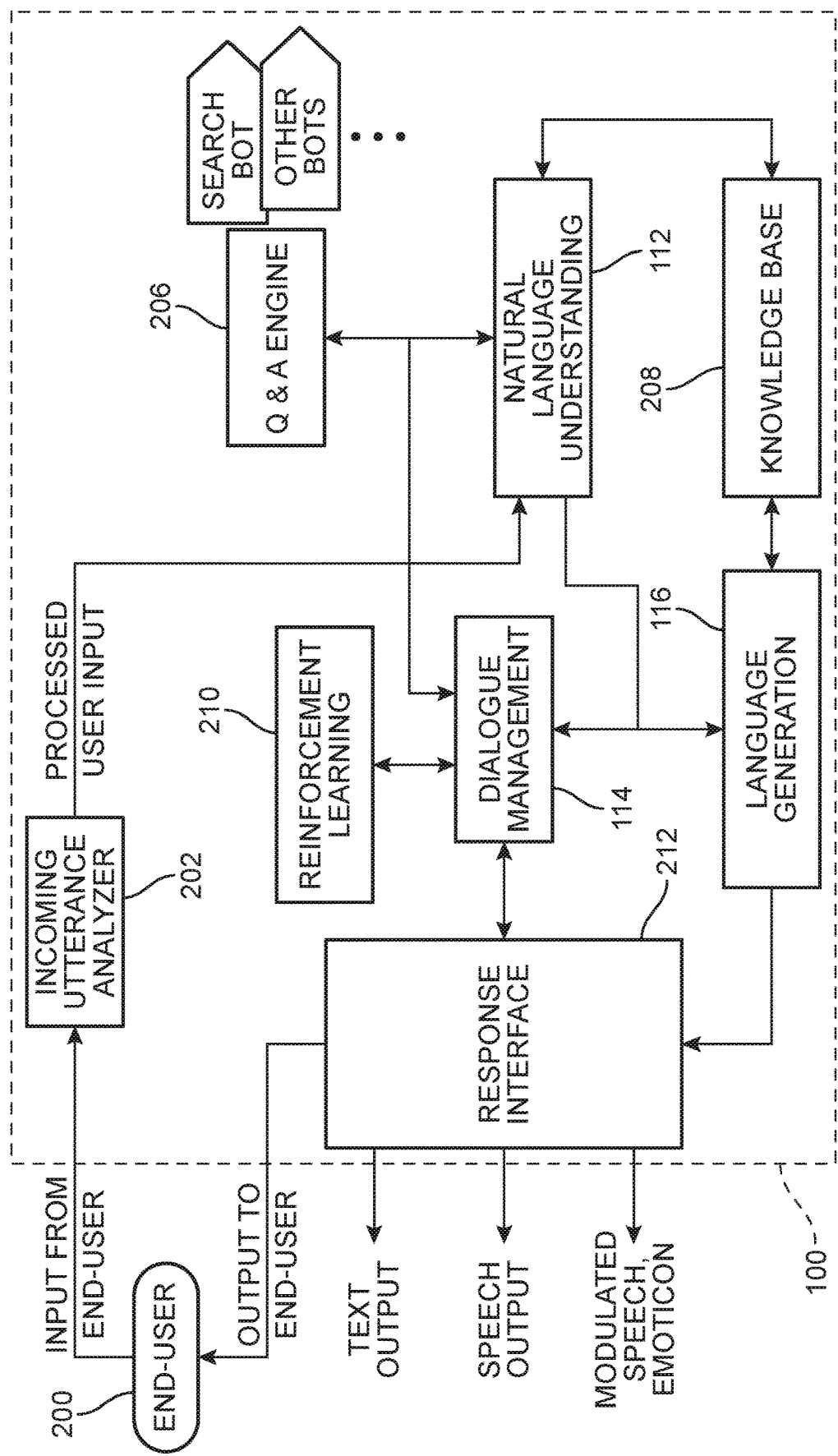
FIG. 2 is a schematic diagram of an embodiment of an architecture of a virtual agent.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to natural language understanding system 112 to extract meaning from the end-user input.

Natural language understanding system 112 may further communicate with dialogue management system 114. In some cases, natural language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, natural language understanding system 112 and/or dialogue management system 114 may communicate with a Q&A ("Question & Answer") Engine 206. Q&A Engine 206 can include sub-modules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

A virtual agent and associated systems for communicating with a virtual agent may include one or more user devices, such as a computer, a server, a database, and a network. For example, a virtual agent running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual agent using a phone (e.g., a landline or a cell phone), the communication may pass through a telecom network and/or a wide area network.

The user device may be a computing device used by a user for communicating with a virtual agent. A computing device could be may a tablet computer, a smartphone, a laptop computer, a desktop computer, or another type of computing device. The user device may include a display that provides an interface for the user to input and/or view information. For example, a user could interact with a virtual agent using a program run on a laptop computer, such as a text-based chat program, a voice-based communication program, and/or a video-based communication program. Alternatively, in some cases, the user device could be a telephone (e.g., a landline, cell phone, etc.).

One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Figure 3:
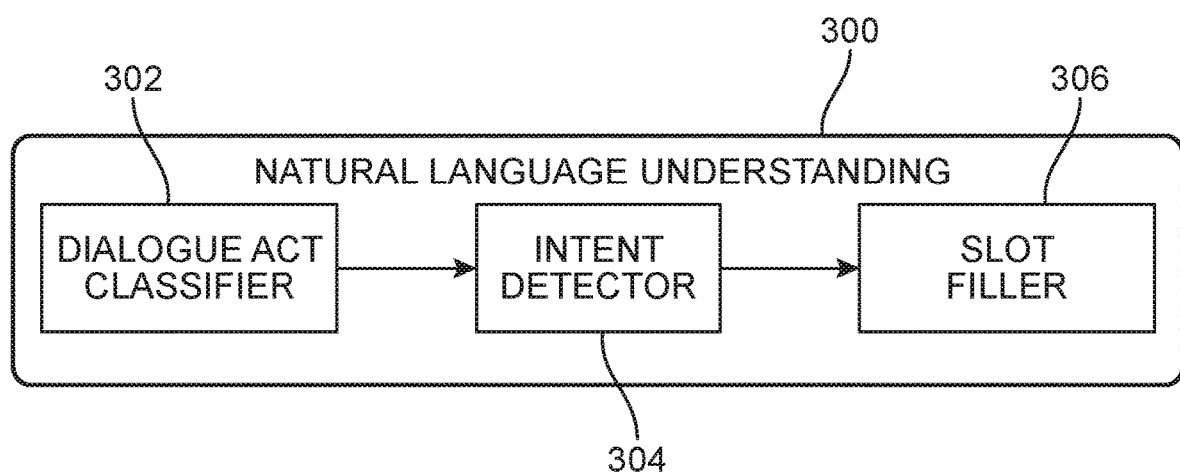
FIG. 3 is a schematic diagram of an embodiment of a natural language understanding system.

FIG. 3 shows a schematic diagram of an embodiment of a natural language understanding system 300. The natural language understanding system includes three main components: a dialogue act classifier, an intent detector, and a slot filler. For example, natural language understanding system 300 includes a dialogue act classifier 302, an intent detector 304, and a slot filler 306. The dialogue act classifier classifies a word sequence into a dialogue act category. Rather than focus on the specific topic of the word sequence, the dialogue act category defines the type of communication indicated by the word sequence. Examples of dialogue act categories include question or query, greeting, command or request, and information. In one example, if a user says, "I want to fly from Seattle to Chicago," then the category is "command." In another example, if a user says, "I want to eat Chinese food that is medium-priced and from restaurants that are in the eastern part of the city," then the category is "command." In yet another example, if the user asks, "what is the weather like today?", then the category is "question." In yet another example, if the user says, "hello", then the category is greeting.

The slot filler extracts constituents from the word sequence. In other words, the slot filler finds goal-relevant pieces of information in the word sequence to determine which slot information, including slot names and slot values apply to the situation. For example, if a user says, "I want to fly from Seattle to Chicago," then the slots for this string of words could be "From-City" and "To_City." The value for the "From-City" slot is "Seattle" and the value for "To_City" is "Chicago." In another example, if a user says, "I want to eat Chinese food that is medium-priced and from restaurants that are in the eastern part of the city," the slots for this string of words could be "food", "price", and "area". The value for "food" is "Chinese". The value for "price" is "medium". The In different embodiments, the spoken language understanding system includes a bidirectional RNN, a forward RNN, a first softmax function, and a second softmax function. For example, the spoken language understanding system includes a bidirectional RNN (encoder), a forward RNN (decoder), a first softmax function (decoder), and a second softmax function (decoder). The forward RNN, first softmax function, and second softmax function make up a decoder unit that serves as an output device. The three decoders of the decoder unit share the same encoder. For example, the forward RNN (decoder), first softmax function (decoder), and second softmax function (decoder) share the bidirectional RNN (encoder). In some embodiments, the first softmax function may include a slot filler. In some embodiments, the second softmax function may include an intent detector. In some embodiments, the third softmax function may include a dialogue act classifier.

The bidirectional RNN comprises two unidirectional RNNs. Specifically, the bidirectional RNN includes a backward RNN including a first set of components that are run in backward time order and a forward RNN including a second set of components that are run in forward time order. For example, the bidirectional RNN includes a first set of components including a first component, a second component, a third component, and a fourth component. In this example, the first set of components reads the word sequence in a backward time order and generates a sequence of hidden state representations ($bh_T$, $bh_1$), which are shown as arrows directed away from the first set of components. The bidirectional RNN includes a second set of components including a fifth component, a sixth component, a seventh component, and an eighth hidden start. In this example, the second set of components reads the word sequence in a forward time order and generates a sequence of hidden state representations ($fh_1$, . . . , $fh_T$), which are shown as arrows directed away from the second set of components.

Thus, a method of spoken language understanding includes receiving a plurality of words, or a word sequence. The method may include processing the user word sequence through a bidirectional RNN to generate a bidirectional RNN output. The method may also include applying a context vector to the bidirectional RNN output to generate a weighted bidirectional RNN output. The method can further include processing the weighted bidirectional RNN output through a forward RNN to generate forward RNN output.

In addition, the method may include using the forward RNN output to generate slot information, including slot names and slot values related to the word sequence. The method may further include outputting the slot information. The method may include processing the forward RNN output through the first softmax function to determine an intent related to the word sequence. The method may include processing the forward RNN output through the second softmax function to determine a dialogue act category related to the word sequence.

By sharing the same encoder, the last three steps mentioned above may be performed jointly. Performing the three functions jointly increases the efficiency of the spoken language understanding system by eliminating the need to wait on one function before performing the next function. Additionally, performing the three functions jointly also improves the accuracy of each function because the processing of each function can inform the processing of the other functions. For example, the intent and the slots are closely interrelated, and each may be used to determine the other.

As previously mentioned, the method of spoken language understanding includes receiving a word sequence. In some embodiments, the word sequence may include a first word and a second word provided in a forward direction in which the first word comes before the second word. In other embodiments, the word sequence may include more than two words. For example, in one embodiment, the word sequence may include three words. In another example, in one embodiment, the word sequence may include between three and twenty words. The word sequence may include a word sequence that was converted from an acoustic sequence uttered by a human user. For example, in some embodiments, a speech recognition system converts spoken words into a word sequence.

The structure of the bidirectional RNN allows the next layer (e.g., the forward RNN) to have both backward and forward information about the word sequence at every time step. In other words, the bidirectional RNN passes information about the past and future of the word sequence to the next layer.

As previously mentioned, the spoken language understanding method may include processing the user word sequence through a bidirectional RNN to generate a bidirectional RNN output. The bidirectional RNN output may include a forward hidden state representation and a backward hidden state representation for each word of the word sequence. Each component of the bidirectional RNN may process the word aligned with the respective component, and generate a bidirectional RNN output (e.g., hidden state representation) for each word of the sequence. Because this bidirectional RNN output is fed to the next layer, the bidirectional RNN output is formatted as a hidden state representation that the next layer can understand and use. For example, as discussed above, the bidirectional RNN output of each component may include a hidden state representation, such as a vector.

When the bidirectional RNN output is fed to the next layer, the hidden state representation of the first set of components are concatenated with the second set of hidden state representations of the second set of components at each time step i to generate a final hidden state representation $h_i = [fh_i, bh_i]$ of the encoder. The last final hidden state representation $h_T = [f\ h_T, bh_T]$ of the encoder may carry information of the entire source sequence. In embodiments in which an attention mechanism is not used, the last final hidden state of the encoder would be input directly into the decoder.

The forward RNN includes a set of components. As the next layer after the bidirectional RNN, the forward RNN receives the output from both the first and second sets of components of the bidirectional RNN. The forward RNN is attention based. Accordingly, the spoken language understanding method may include applying a context vector to the bidirectional RNN output to generate a weighted bidirectional RNN output. This step may include applying a context vector while processing the bidirectional RNN output through a forward RNN. The context vector is a weight that indicates how much focus should be placed on the forward hidden state representation and the backward hidden state representation for each word of the word sequence. For example, a context vector $C_i$ can be fed into each component of the forward RNN. The context vector $C_i$ is a weight that tells each component of the forward RNN how much focus should be placed on the concatenated hidden states input from the previous layer. For example, if a user says, "from Seattle to Chicago," the words "Seattle" and "Chicago" may be selected for more focus. In such a case, assuming $X_1$ is "from", $X_2$ is "Seattle", $X_3$ is "to", and $X_4$ is "Chicago", $C_2$ and $C_4$ will have higher values than $C_1$ and $C_3$. The context vector $C_i$ can be computed as a weighted sum of the encoder hidden states representations, $h = (h_1, \ldots, h_T)$. The context vector $C_i = \Sigma_{j=1}^{T} a_{i,j} h_j$ and $$\alpha_{i,j} = \frac{\exp(e_{i,j})}{\sum_{k=1}^{T} \exp(e_{i,k})}$$

where $e_{i,k} = g(S_{i-1}, h_k)$ and g is some parametric function, such as a linear function or a neural network. The values of parameters of g and the attention coefficients (alphas) are learned during the training process, as discussed in more detail below with respect to training. The context vector provides additional information to the first and second softmax functions, as discussed in more detail below with respect to the first and second softmax functions. The attention mechanism can also be applied to the first softmax function and the second softmax function to help place focus on appropriate areas when processing hidden state representations through the first softmax function and the second softmax function.

The spoken language understanding method may include processing the weighted bidirectional RNN output through a forward RNN to generate forward RNN output. In some embodiments, the bidirectional RNN may comprise an LSTM or, alternatively, a GRU that controls how information is passed down from layer to layer of the spoken language understanding system. For example, the LSTM or GRU may control how much information to pass forward and how much information to forget at each time step. Controlling how information is passed down from layer to layer increases the accuracy and efficiency of slot filling, finding the user intent, and classifying the word sequence by providing useful information during each time step while eliminating information that is irrelevant to the respective time step.

As previously mentioned, the spoken language understanding method may include outputting slot names and slot values related to the word sequence. These slot names and slot values are forward RNN output. For example, the forward RNN output can be a hidden state representation, $S_i$. At each time step i of the forward RNN (decoder), the forward RNN output is calculated as a function of the previous decoder hidden state representation $S_{i-1}$, the previous decoder-emitted label $y_{i-1}$, the encoder hidden state representation $h_i$, and the context vector $C_i$. Thus, $S_i = f_{slt}(S_{i-1}, y_{i-1}, h_i, C_i)$. The forward RNN output includes slot names and slot values that apply to the situation (e.g., that are related to the word sequence). Using the example a user saying "from Seattle to Chicago" from above, the forward RNN uses attention to determine that the word sequence received by the bidirectional RNN includes a "From-City" slot, and that "Seattle" is the slot value for the "From-City" slot. In the same example, the forward RNN uses attention to determine that the word sequence received by the bidirectional RNN is a "To-City" slot, and that "Chicago" is the slot value for the "To-City" slot.

To provide more context when determining slot names and slot values, the output from a component of the forward RNN is provided as input to a component that comes later in forward time order in the second set of components of the bidirectional RNN. In some embodiments, the forward RNN may comprise an LSTM or, alternatively, a GRU that controls how information is passed down from layer to layer of the spoken language understanding system. For example, the LSTM or GRU may control how much information to pass forward and how much information to forget at each time step. Controlling how information is passed down from layer to layer increases the accuracy and efficiency of slot filling, finding the user intent, and classifying the word sequence by providing useful information during each time step while eliminating information that is irrelevant to the respective time step.

As previously mentioned, the spoken language understanding system includes a first softmax function and a second softmax function. A Softmax function is a known machine-learning process for classifying a set of inputs into distinct classes. Here, the Softmax function is used by the first softmax function and the second softmax function to determine the intent and the dialogue act category, respectively, as discussed below.

The spoken language understanding method may include outputting the forward RNN output to the first softmax function and the second softmax function. As previously mentioned, the spoken language understanding method may include processing the forward RNN output through the first softmax function to determine an intent related to the word sequence. The first softmax function may receive the decoded output of each component of the forward RNN and generate the intent class label from the decoded output. In some embodiments, the intent decoder state is scalar, and is a function of the shared initial decoder state representation $S_0$, which encodes information of the entire word sequence and the context vector C, which indicates part of the source sequence that the intent decoder pays attention to.

In embodiments with only one intent, the initial decoder state representation $S_0$ may be the only state included because the decoder has only a single state. In such a case, $S_1 = f_{int}(S_0, C)$, in which $S_0$ is set to the last encoder state, $h_T$, arbitrarily. In other embodiments, multiple intents may be generated. For example, a user may say, "I'm interested in flight schedules and ground transportation." In this example, the intents may be "flights" and "ground transportation." To produce multiple intents, the output may be generated in a manner similar to the generation of the slots during slot filling. For example, probabilities may be used to determine whether the word sequence belongs in each intent class.

As previously mentioned, the spoken language understanding method may include processing the forward RNN output through the second softmax function to classify the word sequence into a dialogue act category. The second softmax function may receive the decoded output of each component of the forward RNN and classify the word sequence into a dialogue act category. Then, second softmax function uses this input to generate N, the hidden state representation (or dialogue act classification decoder state representation $S_i$) of the category of the word sequence. In other words, second softmax function uses this input to classify the word sequence. In some embodiments, the dialogue act classification decoder state is scalar, and is a function of the shared initial decoder state representation $S_0$, which encodes information of the entire word sequence and the context vector C, which indicates part of the source sequence that the dialogue act classification decoder pays attention to. In embodiments with only one dialogue act class, the initial dialogue act classification decoder state representation $S_0$ may be the only state included because the decoder has only a single state. In such a case, $S_1 = f_{dac}(S_0, C)$, in which $S_0$ is set to the last encoder state, $h_T$, arbitrarily.

In some embodiments, the output from the second softmax function may be used as additional input into the first softmax function. In such a case, when the first softmax function is an intent decoder and the second softmax function is a dialogue act classification decoder, the dialogue act category of the word sequence determined by the second softmax function may be input into the first softmax function. As a result, the first softmax function can have more context for determining the intent of the word sequence. For example, if the second softmax function determines that the dialogue act category of the word sequence is a greeting, then the first softmax function may determine that word sequence has no task-related intent. Providing more context to the first softmax function can improve the efficiency and accuracy of the first softmax function.

In some embodiments, the output from the second softmax function may be used as additional input into the forward RNN. In such a case, when the second softmax function is a dialogue act classification decoder and the forward RNN is a slot filler, the dialogue act category of the word sequence determined by the second softmax function may be input into the forward RNN. As a result, the forward RNN can have more context for determining the slot values of the word sequence. For example, if the second softmax function determines that the dialogue act category of the word sequence is a greeting, then the forward RNN may determine that word sequence has no task-related slot values. Providing more context to the forward RNN can improve the efficiency and accuracy of the forward RNN.

In some embodiments, the output from the first softmax function may be used as additional input into the forward RNN. In such a case, when the first softmax function is an intent decoder and the forward RNN is a slot filler, the dialogue act category of the word sequence determined by the first softmax function may be input into the forward RNN. As a result, the forward RNN can have more context for determining the slot values of the word sequence. For example, if the first softmax function determines that the intent of the word sequence is to find a flight, then the forward RNN may determine that word sequence has slot values related to finding a flight. Providing more context to the forward RNN can improve the efficiency and accuracy of the forward RNN.

In some embodiments, the bidirectional RNN (encoder) may comprise a stack of multiple RNNs. By using a stack of multiple RNNs, multiple sentences may be captured and processed by the spoken language understanding system at one time. Processing multiple sentences in one process provides more context for the encoder and decoders to work with. For example, if a user says, "I would like to go to Boston from Chicago" in one sentence and then says, "I would like to fly" in the next sentence, these two sentences can be used together to determine that a user would like to fly from Chicago to Boston. In some embodiments, additionally or alternatively, the RNNs on the decoder side may also include a stack of multiple RNNs. Providing more context to the bidirectional RNN can improve the efficiency and accuracy of the bidirectional RNN.

In some embodiments, the spoken language understanding system may process individual characters, in place of or in addition to the words of a word sequence. Processing individual characters can help provide more information to the spoken language understanding system. For example, if the word sequence includes a word such as "Georgetown," the spoken language understanding system can find the sub-word of "town" when processing characters of the word sequence. By recognizing the word "town," the spoken language understanding system can determine that "Georgetown" is a city. Providing more information to the spoken language understanding system can improve the efficiency and accuracy of the spoken language understanding system.

Training the system for spoken language understanding is based on the supervised learning paradigm, which involves providing annotated training corpora to the bidirectional RNN. The annotated corpora may be passed along from the bidirectional RNN to the forward RNN, the first softmax function, and the second softmax function. The annotated training corpora may include dialog-based data with the annotations for the dialogue act classifier, intent classifier, and slot values. As discussed in more detail below, the annotated training corpora are employed to train the spoken language understanding system. The input provided for training may include a user utterance along with the corresponding desired slot, intent, and dialog act category labels. During training, the method may be performed using known word sequences with the added steps of calculating error (i.e., the difference between the desired output and the actual output), minimizing the resultant cost (or error) function corresponding to each of the three functions, and back-propagating the resultant costs to the encoder. These added steps help optimize the parameters of the above-discussed equations used to perform the method for spoken language understanding.

As understood from above, an intent detector identifies the user's intent. The intent detector focuses on the specific topic of the word sequence to determine what it is the user desires. Examples of intents include flight, ground transportation, restaurant, and computer fault diagnosis. In one example, if a user says, "I want to fly from Seattle to Chicago," then the intent is "flight." In another example, if a user says, "I can't log into my email," then the intent is "logging in." It is understood that the intent detector may be used by itself or in conjunction with the dialogue act classifier and/or slot filler.

In addition, at a more high-level, conversations themselves can be associated with broad intent or be directed toward or attempting to facilitate a specific task or goal. A virtual agent (or conversation system) can be trained to identify a user's intent from a conversation, thereby providing an intent label for the conversation as a whole, rather than only for a word sequence of that conversation. In some embodiments, the system involves using an iterative process of clustering meta data (converted into feature representations) from multiple conversations used for training a machine learning model into labeled clusters having similar user intents. Clustering enables labeling meta data from a large number of training conversations efficiently. By labeling a single cluster, many data points can be labeled at once. For example, clustering can narrow meta data from 10,000 conversations to 200 clusters, each of the clusters varying in number of data points (e.g., 180 data points in one cluster and 40 data points in another cluster). By labeling 200 clusters, you reduce the time/effort/resources (including computer or network resources, for example) needed to label 10,000 individual conversations. The labeled clusters may be used to train a virtual agent to classify the conversational intent of a conversation. Then, the machine learning model can classify future conversations based on similarity to labeled clusters. By knowing a human user's intent as they move through a conversation, a virtual agent can deliver what the user desires.

While simply clustering conversations can reduce the effort required to label data points, a single run of clustering may not be sufficient. For example, a single run of clustering may lead to outliers (data points not identified as part of a cluster) that would have to be individually labeled if the clustering process stopped after a single run. The disclosed system and method include an iterative clustering process that helps reduce the number of outliers by performing a subsequent clustering process on the outliers from a previous clustering process. For example, a second clustering process performed on outliers from a first clustering process can help identify clusters among the outliers from the first clustering process. The previous clustering process has at least one adjustable parameter. For the subsequent clustering process, the at least one adjustable parameter can be adjusted. In another example, if a second clustering process yields any outliers, a third clustering process can be performed with another adjusted parameter on these outliers. The clustering process can be repeated until the model reaches the stopping criteria or no new clusters are found over few iterations A factor making it harder to train a machine learning model to discover user intent is when the labeled data has an unbalanced distribution of data points. An unbalanced dataset can bias the clustering towards the more common class. For example, if hundreds of past conversations have the intent of "help with logging in" and only three past conversations have the intent of "help with bulk email digest", then clustering may result in the three past conversations having the intent of "help with bulk email digest" to be mislabeled as having the intent of "help with logging in". By training a virtual agent (or conversation system) to identify a user's intent from a conversation with an iterative clustering process, the number of mislabeled data points are reduced. For example, a first run of clustering can be performed with parameters for the clustering model set to find a more common class. Then, this more common class can be removed from the data points. During a second run on the remaining points (which can be performed with one or more adjusted parameters), the absence of the more common class means that the clustering will not be biased toward the more common class. Also, using an iterative clustering process that applies at least one adjustable parameter can help fine tune each subsequent clustering process by adjusting the at least one adjustable parameter.

The iterative clustering process improves the quality of labeling by reducing the number of mislabeled data points (data points found to be in a cluster with conversations having a different user intent) from previous clustering processes and running them again through subsequent clustering processes in which at least one parameter is adjusted. A subsequent clustering process can give a mislabeled data point another chance at being part of a cluster labeled with the proper corresponding user intent.

In one aspect, the disclosure provides a method training a virtual agent to identify user's intent from a conversation. The method may include receiving a set of conversations and related meta data. The set of conversations may each comprise a word sequence including a plurality of words. The method may include converting each of the set of conversations and related meta data into a set of feature representations in a multi-dimensional vector space. The method may include using density-based spatial clustering of applications with noise (DBSCAN) to identify a first set of clusters among the set of feature representations, the DBSCAN model including at least one adjustable parameter. The method may include generating a subset of feature representations by filtering the feature representations in the first set of clusters from the set of feature representations. The method may include adjusting the at least one adjustable parameter of the DBSCAN model. The method may include using the DBSCAN model with the adjusted parameter to identify a second set of clusters among at least the subset of feature representations. The method may include training the virtual agent to classify the conversational intent of a conversation using the first set of clusters and the second set of clusters.

The clustering model runs multiple iterations over the data. The iterative process can adapt the problem space to find large clusters first and then increasingly smaller clusters in subsequent iterations. Adapting the problem space in this manner may include changing the parameters of the clustering process. For example, the parameters for a DBSCAN model includes E, a parameter specifying the radius of a neighborhood with respect to some point, and minPts, the minimum number of points required to form a dense region (or cluster). In some embodiments, a cosine measure is used as a distance function for calculating the clusters. Finding large clusters first and then finding increasingly smaller clusters can be done by increasing the distance and/or reducing the minimum number of points used to define a cluster at each iteration of the clustering process. In some embodiments, the model can stop searches when the distance become too large or number of minimum points decrease to a certain limit. At each iteration when the clusters are formed, the clusters may be evaluated for containing noisy data and bad clustered points that can both be added to the unlabeled set for the evaluation at next iteration. In some embodiments, cluster searching may end when the model reaches predetermined stopping criteria or no new clusters are found over a predetermined number of iterations.

Thus, the clustering process involves a number of steps. A set of unlabeled conversations with meta data can be converted to feature representations. The unlabeled conversations may include entire conversations or only portions of the conversations (e.g., a user's first utterance, a user's first few utterances, or a portion of the user's and responsive human or robot's utterances. The set of conversations may include a conversation (or chat) log. The set of conversations may be used to train a domain-specific model (e.g., a domain-specific word2vec model), which contains a numerical representation in the form of a vector for each word in the conversations. This model may be used to convert text data to numerical representation. For example, the meta data from the set of conversations may be converted to feature representation by a word2vec model. After conversion, each conversation may be represented as a 1D numeric vector. A conversation feature matrix may be generated and at least one model parameter may be set. The feature representations may be run through a DBSCAN model. As a result of running the DBSCAN model, a first set of conversations may be mapped to a first set of clusters and a second set of conversations may not be mapped to the first set of clusters.

The first set of conversations (or first set of clusters) may be added to a final cluster as mapped conversation. The second set of conversations may be labeled as unmapped conversations. Then, the unmapped conversations may be run through a subsequent iteration of the DBSCAN model in which one or both of the parameters are adjusted. For example, as discussed above, a parameter in the previous iteration may be set to capture relatively large clusters, and the same parameter may be adjusted in the subsequent iteration to capture a smaller cluster. The clustering process may be ended when no new clusters are found or stopping criteria is reached.

In some embodiments, conversation meta data is the main input to the clustering algorithm to cluster the conversations. The length of the text of meta data is very small compared to a whole conversation. The smaller size of meta data makes it easier to use for clustering than whole conversations. As discussed above, the meta data (e.g., conversation summary) can be in the form of text data, which is converted to numerical representation by using domain word2vec model. In some embodiments, the text may be converted by performing one or more of the following steps: (1) the text is normalized by removing all the punctuation; (2) tokens are extracted from the text by splitting (whitespace splitter); (3) stop words are removed; (4) for each token, vectors are extracted from the word2vec model (output of this step is a 2-D matrix where each row represents a vector for each word); (5) word-vectors are added and normalized by the number of words which generates a 1-D representation of the conversation meta data. Unseen words in the text may be initialized using a normal distribution between a range (−1, 1).

In some embodiments, once the conversations are clustered, a human expert may go through the clustered conversations to include or exclude an entire cluster or one or more conversations within a cluster. If a cluster is removed all the points in that cluster are considered again for new cluster generation. If one or more conversations are removed the data points corresponding to the one or more conversations.

If the cluster is correctly formed with a similar set of conversations, a label may be added to cluster, hence adding a label directly to multiple conversations at once. Once a clustering job is done and no other clustering can be found, a classification model can be trained with a conversation and a corresponding label to create a intent model to infer user goals during conversations. In some embodiments, the disclosed intent training may be done on the actual conversations, where training data is collected by extracting the first few utterances of the customer and an intent label is used as an end class to build a mapping function. This step is called label propagation, since partially labelled data gives an estimate of different classes, this set may be used for training a mapping function from conversation to intent. The unlabeled data after the clustering phase may be used in this step to propagate the label with high confidence prediction to the unlabeled data. In some embodiments, after this step 90-97% data can be annotated with a classifier for user intent to use in chat bot.

In some embodiments, instead of training a classifier to propagate the label to the unlabeled points, an active learning mechanism can add labels to all the data points. In some embodiments, active learning may train a classifier to find the points with very low confidence which may then be passed to human expert for labelling.

As noted earlier, classifications and other data obtained via implementations of the above-disclosed systems and methods can be used to create nodes and assign word sequences to a node in a conversation graph as well as form corresponding transitional paths. Generally, a conversation graph can be understood to represent a plurality of conversations that have occurred and were directed to a particular task, intent, goal, and/or objective. This type of graph is illustrated as a series of nodes or clusters that represent a simpler sub-task comprising the larger task. The transitional paths represent an interconnection between two sub-tasks.

As one example, a conversation can be directed to a larger task of assisting in a screen share functionality for a customer. For example, a customer may have requested help from a virtual or human agent to guide the customer in initiating a screen sharing session from their desktop for a work project. A sub-task of this task can include a question from the agent to the customer to determine what position or access privileges the customer has in the organization. This type of utterance can correspond to an information seeking- or question- or query-type of node in the graph, for example with a slot name related to the possible position or job title. The response from the customer can be received by the agent and the subsequent reply by the agent (based on the information conveyed by the customer's response) can correspond to an action- or resolution-type node in the graph. The two nodes can be connected by a transitional path or edge representing the customer's response.

Figure 4:
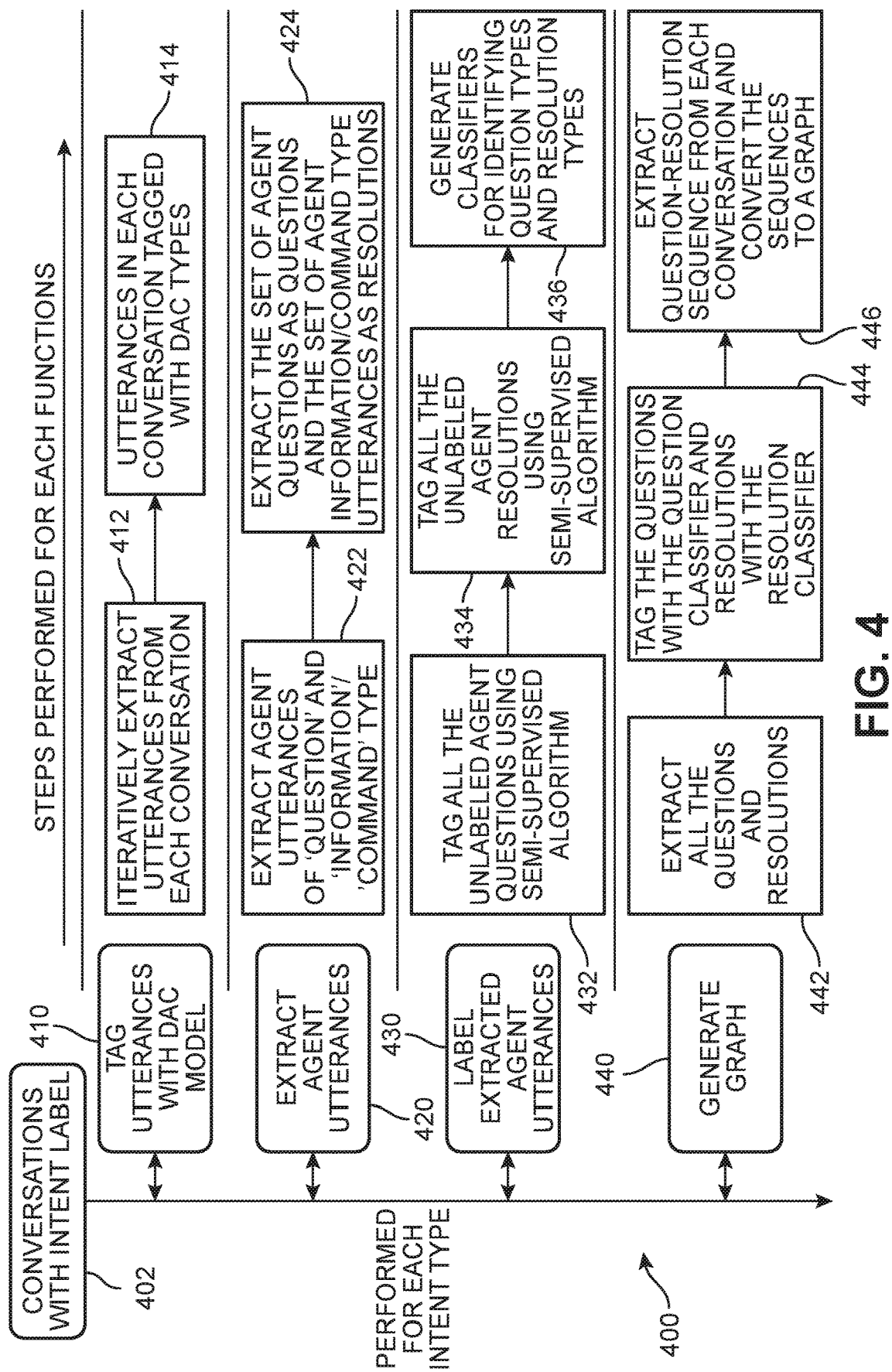
FIG. 4 is a schematic flow diagram of a process for generation of a conversation graph, according to an embodiment.

In FIG. 4, one embodiment of a process of generating a conversation graph is depicted in a flow diagram 400. At an initial stage 402, a conversation for which an intent label has been determined (i.e., a conversation that has been identified as being directed to a particular task or concept, as discussed above) is obtained and the plurality of utterances and accompanying meta data comprising the conversation are submitted to a dialogue act category (DAC) classifier model in a DAC-tagging stage 410. The utterances can be processed by a voice recognition module to extract textual word sequences that correspond to each utterance in a first step 412. Then, a dialogue act category for each word sequence is obtained using the DAC classifier and is assigned to the word sequence in a second step 414, as discussed earlier.

The tagged word sequences are moved to an agent utterances extraction stage 420. In a third step 422, the utterances associated with an agent in the currently selected conversation are targeted, and those that were assigned dialogue act category types such as 'Question' or 'Information'/Command are removed and/or isolated. In a fourth step 424, the set of agent utterances with a DAC of 'Question' are tagged as Unlabeled Questions, and the set of agent utterances with a DAC of 'Information'/Command are tagged as Unlabeled Resolutions.

In a labeling stage 430, the two sets of agent utterances are processed through a labeling algorithm such as a semi-supervised algorithm. Thus, in a fifth step 432, all of the unlabeled agent Questions are labeled and in a sixth step 434 all of the unlabeled agent resolutions are labeled. This process occurs once for all subtask-types. In a seventh step 436, new classifiers are generated for identifying each question type and each resolution type in the selected conversation. This process also occurs once for all of the sub-tasks.

In a subsequent graphing stage 440, all of the questions and resolutions are extracted in an eighth step 442. The questions are tagged using the question classifier and the resolutions are tagged using the resolution classifier in a ninth step 444. These steps are repeated for all conversations in a collection of conversations determined to have the same intent or goal. Finally, each question-resolution sequence from each conversation is identified, extracted, and converted to a graph in a tenth step 446.

Figure 5:
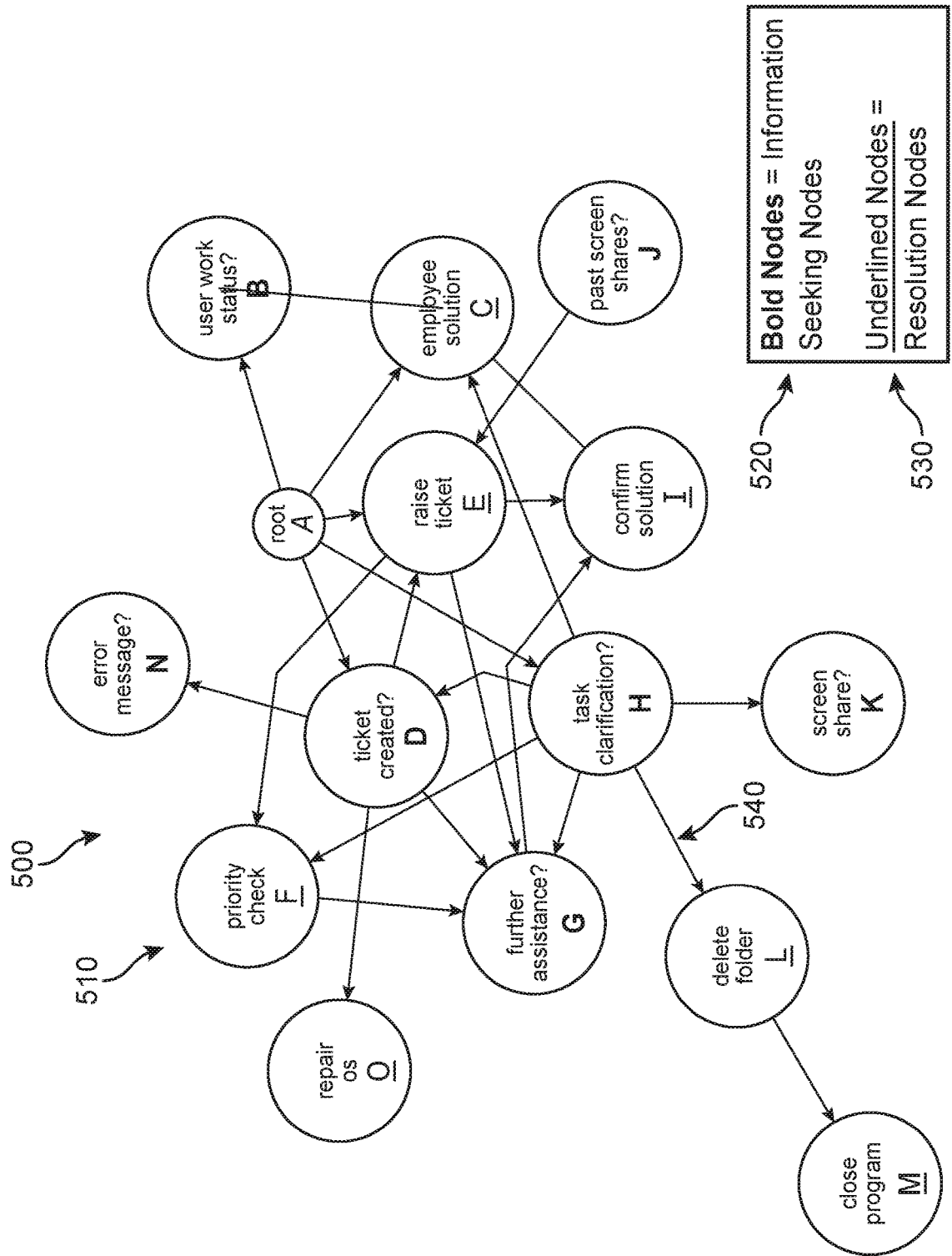
FIG. 5 is an example of a conversation graph, according to an embodiment.

One example of a conversation graph ("graph") 500 is shown in FIG. 5. Formally, a conversation graph may be understood to refer to a directed-cyclic graph such that G=(V, E), consisting of a set V of nodes and a set E of edges (transitional paths), which are ordered pairs of elements of V. The graph also contains cycles (i.e., $\exists \upsilon, \upsilon \in V$ such that, $\upsilon \rightarrow \upsilon$). In the present context of conversations, each node represents similar agent utterances. In other words, a group of similar utterances are 'mapped' to a single node. Thus, one node can represent multiple utterances related to the same sub-task. For example, a node labeled "current_user- _location" (or more simply for purposes of illustration, "User Location?") represents all utterances by agents in the selected group of conversations that reflect this question, such as "Are you working from our main office?"; "Are you in one of our satellite locations?"; "Can you please confirm if you are working from home?"; "Please tell me if you are working from home or working from one of our office locations.", etc. This type of node, for purposes of this application, is what will be referred to as an information seeking node, representing utterances by agents that ask for information from a user. Another type of node will be referred to as an action node, which represents utterances by agents that provide an action and/or resolution to some issue, problem, or objective raised by the user. The transitional paths represent the transition between different concepts. For example, an edge connects two nodes (or a single node to itself) representing two agent utterances, and the edge itself conveys or represents different user utterances that triggered the transition between the two nodes (e.g., a user "Yes" or "No" expressed by a user in response to an agent's question).

In FIG. 5, the conversation graph 500 is a representation of a plurality of conversations that were collected and determined to have an intent or goal directed to the user's difficulties in screen sharing. The graph 500 includes a plurality of nodes 510 that represent different but related sets of agent utterances (or in some embodiments, customer utterances) that were directed to similar sub-tasks. As noted above, in some embodiments, two broad types of nodes may be distinguished. In this case, nodes with letter labels that are bold in FIG. 5 are information-seeking nodes 520, and nodes with letter labels that are underlined in FIG. 5 are resolution nodes 530. Typically, an information-seeking node will connect and/or 'lead to' a resolution node via a transitional path. Thus, in graph 500, a plurality of transitional paths 540 can be seen, interconnecting the larger network of nodes. An arrowhead at one end of the transitional path indicates the direction or order of the word sequences in a conversation, and an optional "sequence frequency" presented next to or in conjunction with each transitional path can indicate how many times the particular sequence between two nodes occurred in the collection of conversations. In other embodiments, there may be no number, or the number may represent a percentage or proportion.

For purposes of clarity, some of the conversation utterance sequences will now be described with reference to the graph 500. An initial node "A" is labeled "root" and represents the starting point of the graph 500. In some embodiments, the initial root node can be representative of the utterance exchange that establishes the overall intent or task of the conversation, or a greeting that initiates the exchange between the agent and customer. Some examples of agent utterances represented by the root node could include "Would you please let me know what issue you are experiencing with the <application name>?, "I apologize for the inconvenience. Can you further elaborate what happened that led to our chat today?", "I understand you are having issues with the <application name>. Can you please elaborate?", or "Can you further elaborate on your question?", etc. In some embodiments, the system can store all of the utterances that are represented by the root node. These additional data content can be accessible to a person accessing the graph 500 (i.e., a graph end-user). For example, the graph itself can provide or serve as an interface, or be displayed in a specialized interface, by which the end-user can adjust graph parameters, display preferences, and view additional details or other types of information about the conversations that were processed and are being represented by the graph 500.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In the context of FIG. 5, an end-user may be presented to a graph 500 where some or all of the elements of the graph 500 correspond to selectable options. For example, an actuation or 'click' on a node (such as Node B) can trigger a presentation of a panel of information adjacent to or overlaid on the graph 500 that lists each utterance that is being represented by Node B (such as the list of utterances described above). Similarly, an actuation or 'click' on a transitional path between two nodes can result in a presentation of a list of customer utterances that were made between the two nodes being connected by that transitional path. For example, a click of a transitional path can trigger display of a list of customer utterances such as "No my password works perfectly with my other account", "I have a Mac Notebook", "I changed my laptop recently", "It used to work but then it stopped this morning", etc. Furthermore, in some embodiments, a double-click of a node, or a selection of multiple interconnected nodes, or another selectable option shown near the graph 500 can trigger the display of portions or the entirety of one or more conversations that were used to generate the conversation graph, allowing the end-user to review the utterances and knowledge base represented by the graph in more detail. In addition, the visual interface presenting the graph 500 can be interactive whereby the end-user may be able to rotate the graph 500 in three-dimensional "space" to view other nodes in the background, to zoom in or zoom out of portions of the graph, or to better view the network of connections between the nodes.

As shown in FIG. 5, from the initial node (Node A, "root") the graph 500 includes multiple nodes that can each correspond to a representation of the first agent utterance in one conversation sequence, including Node B ("user work status?"), Node C ("employee solution"), Node E ("raise ticket"), Node D ("ticket created?"), and Node H ("task clarification?"). In the context of this multiple-sequence depiction, five transitional paths are also shown. Specifically, a first transitional path connects Node A (the root node) to Node B (an information seeking node), a second transitional path connects Node A to Node C (a resolution node), a third transitional path connects Node A to Node E (a resolution node), a fourth transitional path connects Node A to Node D (an information seeking node), and a fifth transitional path connects Node A to Node H (an information seeking node). Along each of these transitional paths, an arrowhead can be seen on the end disposed furthest from Node A, indicating a flow from the root node to the next node.

In addition, as noted above, in some embodiments, a transitional node can include a numerical representation of the frequency over which this particular sequence was detected in the plurality of conversations. In other words, the first transitional path can include a number or other symbol that indicates how frequently the transition from Node A to Node B occurred. As one example, the transition from Node A to Node B may have occurred 11 times, the transition from Node A to Node C four times, the transition from Node A to Node E six times, the transition from Node A to Node D 36 times, and the transition from Node A to Node H 49 times. In some embodiments, the thickness of the transitional path line itself can be thicker or wider as the number increases to reflect the weight associated with the sequence. Thus, in the example above, the transitional path from Node A to Node H would be the thickest or heaviest line, and the transitional path from Node A to Node C would be thinnest or lightest line.

As illustrated by FIG. 5, once a conversation sequence begins, it may include a series of several nodes that are connected by additional transitional paths. For example, the agent can ask the user what the user's employment status is, their position or role within the company, or their access privileges in the company. This type of word sequence for an agent utterance is represented by Node B ("User Work Status?"). The user may identify their status, position, or other clearance, represented by a sixth transitional edge that leads to Node C ("Employee Solution") which represents an agent utterance-word sequence in which a solution was offered or provided to the user that corresponded to the user's answer to Node B's question. In some cases, the first offered solution may not be optimal or applicable, and another solution may be attempted, as represented by a seventh transitional edge that both starts at Node C and ends at Node C in a brief loop. The solution can be confirmed by the agent based on data received and/or user responses, as represented by Node I ("Confirm Solution"), which is a 'terminal node' or 'end node', as signified by the lack of any further transitional paths extending in an outward direction from Node I.

Thus, each node can be understood to represent a collection of word sequences that fall in the same dialogue act category and the same slot name. In other words, a node represents similar utterances across a variety of agent instances or customers across different conversations directed to the same task. In addition, a transitional path between a first node and a second node represents one or more instances where a particular utterance associated with the first node (e.g., Node B) was followed by a particular utterance associated with the second node (e.g., Node C) in a conversation, thereby depicting a dialogue sequence corresponding to a portion of the conversation.

The generation of conversation graphs can provide an end-user with a great deal of information, and have a wide variety of applications. In some embodiments, the data provided by the graph can be used to improve agent-customer conversations. As one example, the generated conversation graph can be ported to or accessed via a visualization interface, as described in FIG. 5, to help agents in real-time conversations that have similar goals or intents. Visualization of the graph can provide an agent with a high-level perspective of the different types of potential sub-tasks associated with the currently pursued intent/task domain, as well as potential inter-dependencies to other tasks.

However, while conversation graphs are powerful tools for depicting large collections of conversations in a graphical form, quick or ready comprehension of a multi-layered conversation graph may be challenging to end-users. For example, there may be complex interactions between different sets of nodes that are not immediately apparent to an end-user, and/or adding domain knowledge to the graph can be challenging. In order to address these aspects, in some embodiments, the conversation graph can be converted to another format that can further simplify the depiction of the set of conversations. One example of such a simplification is a "process tree" that is based primarily on the different path frequencies found in the conversation graph. This process tree can be more readily compared with human-curated knowledge. In some embodiments, such a process tree could be ported to a bot framework for augmenting knowledge about the selected task. The process tree can represent the significant aspects and conversation sequences of the conversation graph and illustrate these nodes and connections in a 'flatter' or streamlined format with branches that are more intuitive, succinct, and/or simpler to follow. A process tree can be understood to represent a smaller, limited, and/or restricted from of the conversation graph, with the cyclic paths removed.

Figure 6:
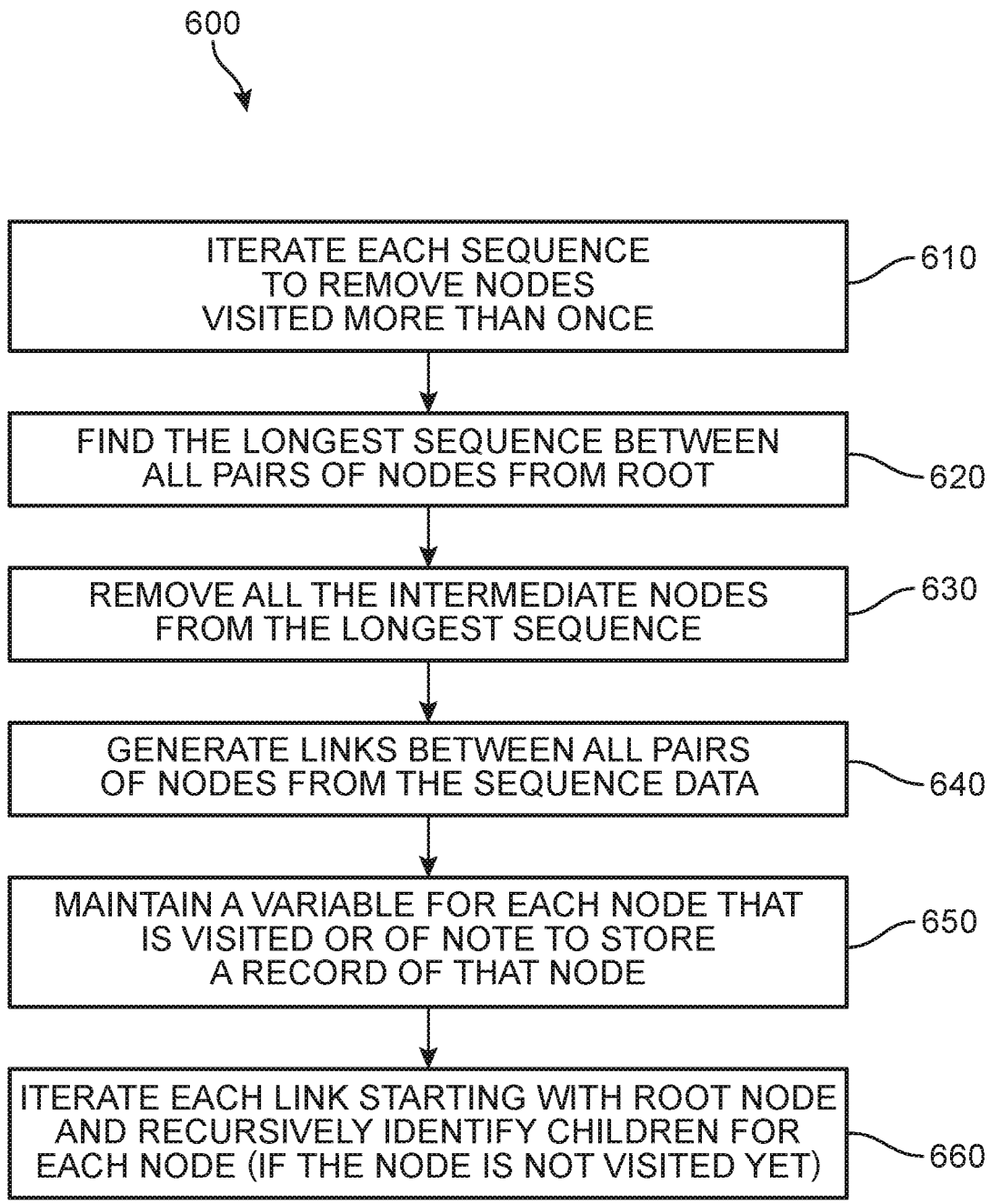
FIG. 6 is a schematic diagram of a high-level flow of producing a process tree, according to an embodiment.

One embodiment of a method for generating a process tree is presented with reference to FIG. 6. In a first step 610, nodes that are visited more than once in a conversation sequence are removed from the graph. For example, a sequence represented by [Node A, Node B, Node B, Node D] has a repeat node (Node B), and can be converted to a sequence [Node A, Node B, Node D] in the first step 610. During a second step 620, the system determines the longest conversation path sequence between all pairs of nodes beginning from the root node. For example, a transition from Node A to Node D can occur across multiple, different paths, such as [Node A, Node B, Node D] and [Node A, Node B, Node C, Node D]. Thus, the second step 620 would extract the longest sequence between Node A and Node D, in this case, [Node A, Node B, Node C, Node D]. Once the longest sequence is identified, all of the intermediate nodes in the longest sequence are removed in a third step 630. In this example, any stored or intermediate sequences between Node A and Node A, Node B and Node A, and Node A and Node C are isolated or removed from the database.

In a fourth step 640, links between all pair of nodes from the remaining sequence data are generated. For example, the sequence extending over [Node A, Node B, Node B, Node D] will be converted to [Root Node, Node A], [Node A, Node B], [Node B, Node C], and [Node C, Node D]. A fifth step 650 involves maintaining a variable for each node to record or store a node that is visited or otherwise of note. Each link, beginning with the Root Node, will be iterated in a sixth step 660, and a recursive process will detect and identify "children" for each node (if the node is not visited yet), or nodes that follow the selected node.

Figure 7:
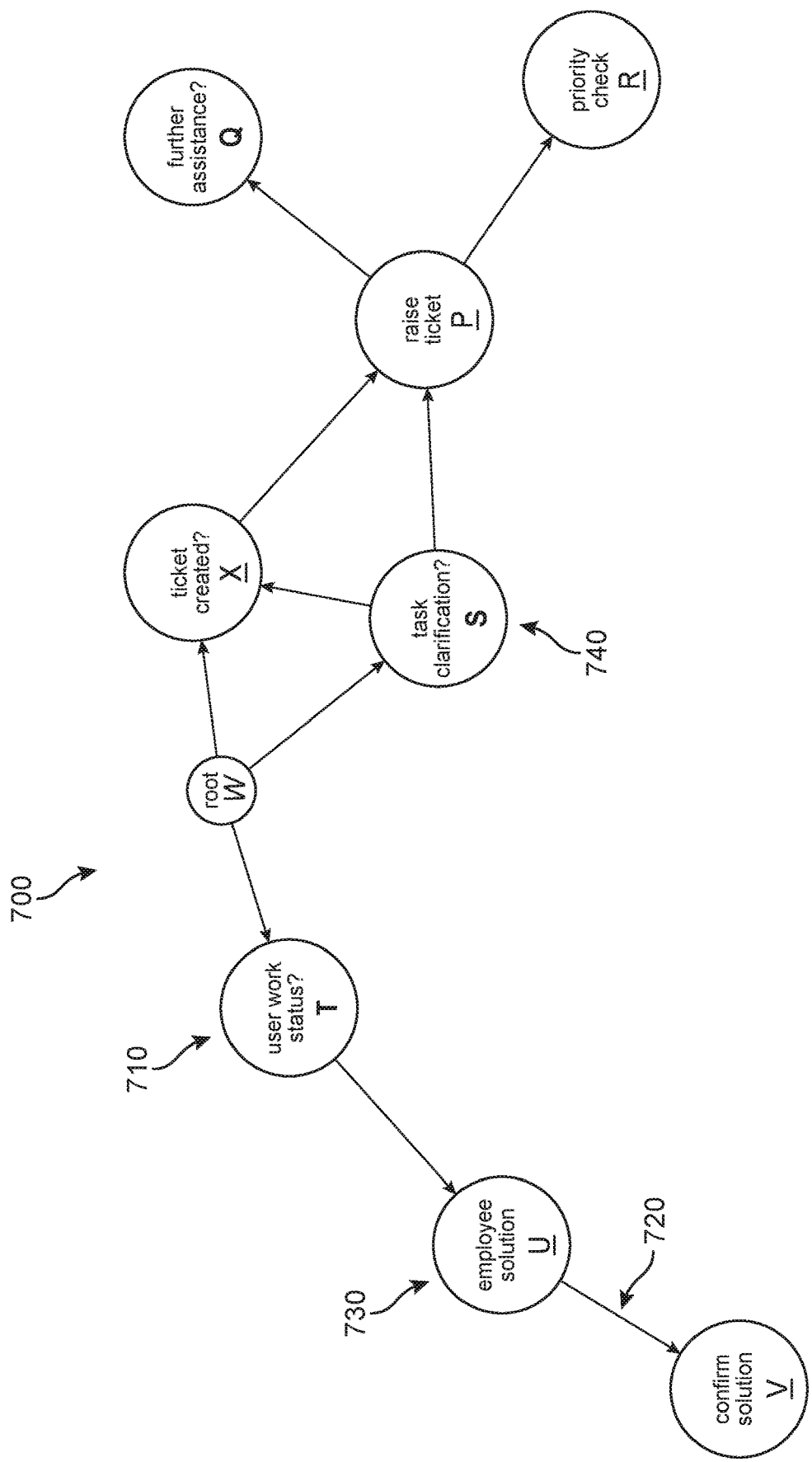
FIG. 7 is an example of a process tree, according to an embodiment.

One example of a process tree ("tree") 700 is shown in FIG. 7. The tree 700 is based on the conversation graph 500 of FIG. 5 representing conversations about screen sharing. The process tree 700 is the result of an implementation of the method described in FIG. 6 as applied to the conversation graph of FIG. 5. As shown in FIG. 7, the process tree 700 includes a Root Node (Node W) as in the graph 500 of FIG. 5. However, the number of a plurality of nodes 710 of the tree 700 is significantly reduced relative to the graph 500 of FIG. 5. In this case, only four information seeking nodes 740 and four resolution nodes 730 are included in tree 700, while seven information seeking nodes 520 and seven resolution nodes 530 are included in the graph 500 of FIG. 5. In addition, the conversation sequence paths 720 are streamlined and more direct, and reduce the number and/or overlap of transitional paths. Such a simplified tree can still provide a great deal of useful information, including the essential queries and resolutions that have been found to be necessary during conversations about the particular task associated with the selected conversations.

In different embodiments, the process tree can be generated automatically or manually. An automatically generated process tree often contains more sub-tasks than a human generated process tree does. As a result, automatically generated trees can be used to bootstrap the collected knowledge (based on the modelled conversations), as well as to add knowledge incrementally from any subsequent similar conversations. For such an application, a qualitative measurement paradigm for evaluating the robustness of a process tree may be implemented, herein referred to as a Tree Completeness Measure, and calculated by as $$\left(\frac{\text{no. of path found}}{\text{total no. of path}}\right),$$

where the number of paths refers to the number of distinct paths found in the tree, and the total number of paths refers to all possible paths over which a particular resolution could occur for one task.

In order to assess the quality of an automatically generated process tree, the automatically generated process tree can be compared with a human-generated process tree. Thus, in some embodiments, a process tree can be compared with a human-generated tree to assess its quality. For example, if a Tree Completeness score (based on the Tree Completeness Measure above) for an automatically generated tree is 2/3 and a Tree Completeness score for a human-generated tree is also 2/3, it may be understood that the two trees are equally comprehensive. In addition, the differences between the two trees can be assessed by considering which distinct paths were selected in the automatically generated process tree and which distinct paths were selected in the human-generated tree. A Tree Completeness score for an automatically generated tree that is equal to or greater than the Tree Completeness score for the corresponding human-generated tree is indicates a high-quality or robust tree.

In different embodiments, a conversation graph can be also used to improve and/or facilitate conversation analysis. Thus, in some embodiments, a conversation graph and its associated data content can guide an end-user by indicating what types of conversations are better suited for automation (e.g., topics that may be handled by a virtual agent), and what types of conversations should be directed to human agents. For example, conversation scenario types and tasks that remain tagged 'unresolved' for 90% of the conversations that were automated can be moved more quickly or directly to a human agent to improve customer experiences and better utilize an organization's resources. Analysis and deeper comprehension of previous conversation patterns can be of great importance to businesses as they create strategies. For example, the success rate and fall-out rate analysis for different issue types as identified from historical chat log records can help businesses pinpoint areas for expanding bot deployment.

For purposes of illustration, some examples of useful conversation goal analyses can be contemplated. In some cases, estimating the end state of a conversation (conversation goal) can help determine the utility of such a conversation. Some examples include (a) "Issue Resolved" where the conversation path always ends with a resolution and such resolution is confirmed by the customer; (b) "Issue Unresolved" where the conversation was extended by doing a remote share or required the intervention of another human agent; (c) "Service ticket raised" where the conversation path had a resolution, but the resolution was the creation of a service request; (d) "Undetermined state" or "Cannot infer" for conversations in which the goal was indeterminate or there was insufficient information to determine the conversation goal; and (e) "Session Abruptly ended" in which the customer left the conversation without answering human-agent's questions.

For each type of conversation, the number of conversations that have had the issue resolved versus the number of conversations of that type that were unresolved can be assessed. For example, a set of previous conversations about a "login issue" may be resolved in 300 of 350 conversations that were about a login issue, while a set of conversations about an "upgrade issue" may only be associated with a 'resolved' label in 200 conversations out of 320 conversations, while the remaining 120 conversations were unresolved or had sessions that ended abruptly.

In different embodiments, a conversation path can be extracted for each goal type to generate seed data using basic pattern extraction. With respect to the examples described above, different sequence patterns may be detected that allow the system to analyze the conversations and quickly identify the conversation goal. For example, a pattern for the goal type "Issue Resolved" can include a conversation path that ended with a resolution node ('res_*') where the customer confirmed the resolution with a positive response. Such a pattern would exclude the presence of a node that ends with a specific resolution type (e.g., a resolution that corresponds to the creation of a service ticket or transfer or assignment of the conversation to a Level 2 support team). A pattern for the goal type "Service Ticket Raised" can include a conversation path that ended with a resolution type in which a service ticket is created or that was assigned to a Level 2 support team. Similarly, a pattern for the goal type "Issue Unresolved" includes conversations that ended but where the customers were connected to a human-agent afterwards (e.g., via remote control). A pattern for the goal type "Session Abruptly ended" includes conversations that ended with agent questions or information seeking utterances, but following such a query no response was received by the customer.

In some embodiments, conversations with patterns that explicitly match with one of the goal types can be used as a training set. In FIG. 8, one example of a flow diagram 'pipeline' 800 of one embodiment of data collection for conversation goal analysis is shown. In this diagram, the unlabeled conversations 810 are initially sent to a pattern extractor 820. The pattern extractor produces partially labeled conversations 830. Referring next to FIG. 9, an example of a training flow diagram 900 is shown. Partially labeled sets of conversations 910 are first sent to a feature extractor 920. Some examples of features extracted for training can include the graph nodes for each of the conversations in the set, the duration of the conversation, whether the conversation was flagged for remote control (human agent intervention), and/or textual conversation data that is then converted via a term frequency-inverse document frequency (TFIDF) algorithm for conversation mapping. This content is sent to a Machine Learning (ML) Classifier 930. The labels are propagated at step 940, where conversations associated with low confidence predictions are marked as a "Cannot Infer" goal type 950. The labels are then used to train a final classifier for subsequent predictions at step 960.

Furthermore, in some embodiments, the conversation graph and associated conversation data can be used for producing and orchestrating automatic conversations, without requiring a task to be defined. For example, because the conversation graph embeds utterance patterns for agents as a plurality of nodes and user utterances as a plurality of transitional paths or edges, it can be understood that the conversation graph implicitly encodes an agent's behavior based on user responses. In other words, agents can be observed to behave differently based on different inputs, and this information—expressed via the conversation graph—can be used to predict a next-best utterance during a real-time chat with a customer. In some embodiments, a machine learning model or a deep learning model for real-time conversation can be generated by inferring data from the conversation graph.

Figure 10:
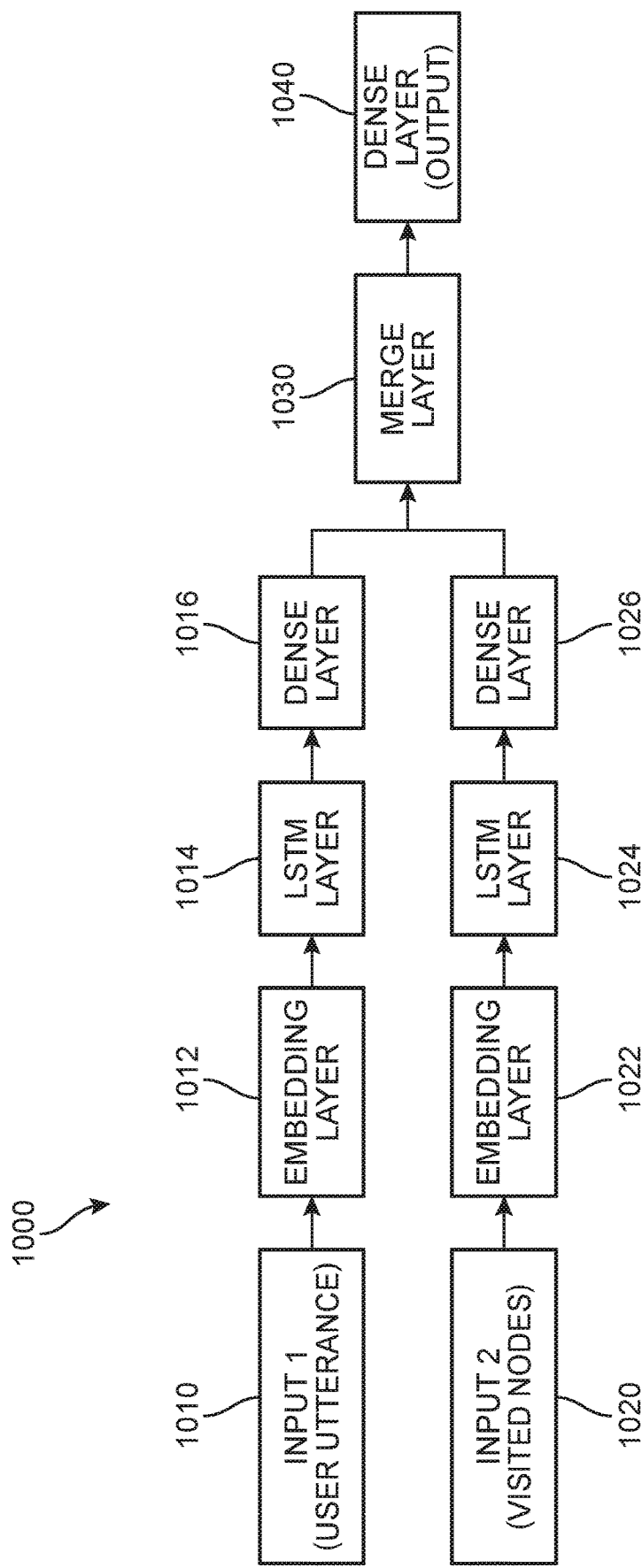
FIG. 10 is a schematic diagram of a neural network architecture for conversation graph inferences for automated conversation, according to an embodiment.

One example of a neural network architecture 1000 that may be used for graph inference is shown in FIG. 10. In a first stage, a first input (current user utterances) 1010 is passed into an embedding layer 1012. The embedding layer 1012 is then passed into a Long-Short-Term-Memory (LSTM) layer 1014. Concurrently, a second input (visited nodes in the conversation graph) 1020 can also be passed into a different embedding layer 1022, which is then passed into another LSTM layer 1024. The embedding layer vector can be 2-10 times larger than the LSTM layer. As an example, the embedding layer may be of a vector size=300 for the first input, while the subsequent LTSM layer has a vector size=100, and the embedding layer may be of a vector size=100 for the second input, while the subsequent LTSM layer has a vector size=50. Furthermore, the LSTM layer 1014 will be passed into a dense layer 1016 while the LSTM layer 1024 will be passed into a dense layer 1026.

The two LSTM layers are then merged in a merge layer 1030, which can decrease the vector size further. Finally, a dense layer 1040 is outputted from the neural network, which is configured to predict the next best node and sample an utterance randomly from the node. In other words, a conversation flow can be automatically generated using a neural network to allow a system to respond in real-time to different customer utterances and conversation paths. These paths can be substantially complex due to the non-linear conversation path prediction process. This type of approach automatically curates textual data from the conversation graph and can automatically generate sample utterances between a pair of nodes.

As a specific example, during a real-time conversation about a particular task, while referring to a conversation graph for the same task, the conversation graph node and transitional path for a first agent utterance and a subsequent customer utterance can be determined and identified. The system can then process a content of the first node and the first customer utterance through the neural network to generate a predictive output identifying a next most likely node based on the knowledge base. All of the utterances stored in association with the next most likely node can be reviewed and a word sequence selected from this group. This word sequence can be automatically presented to the customer as a second agent utterance, and so forth, allowing for more natural and/or applicable agent utterances to be provided to the customer.

Figure 11:
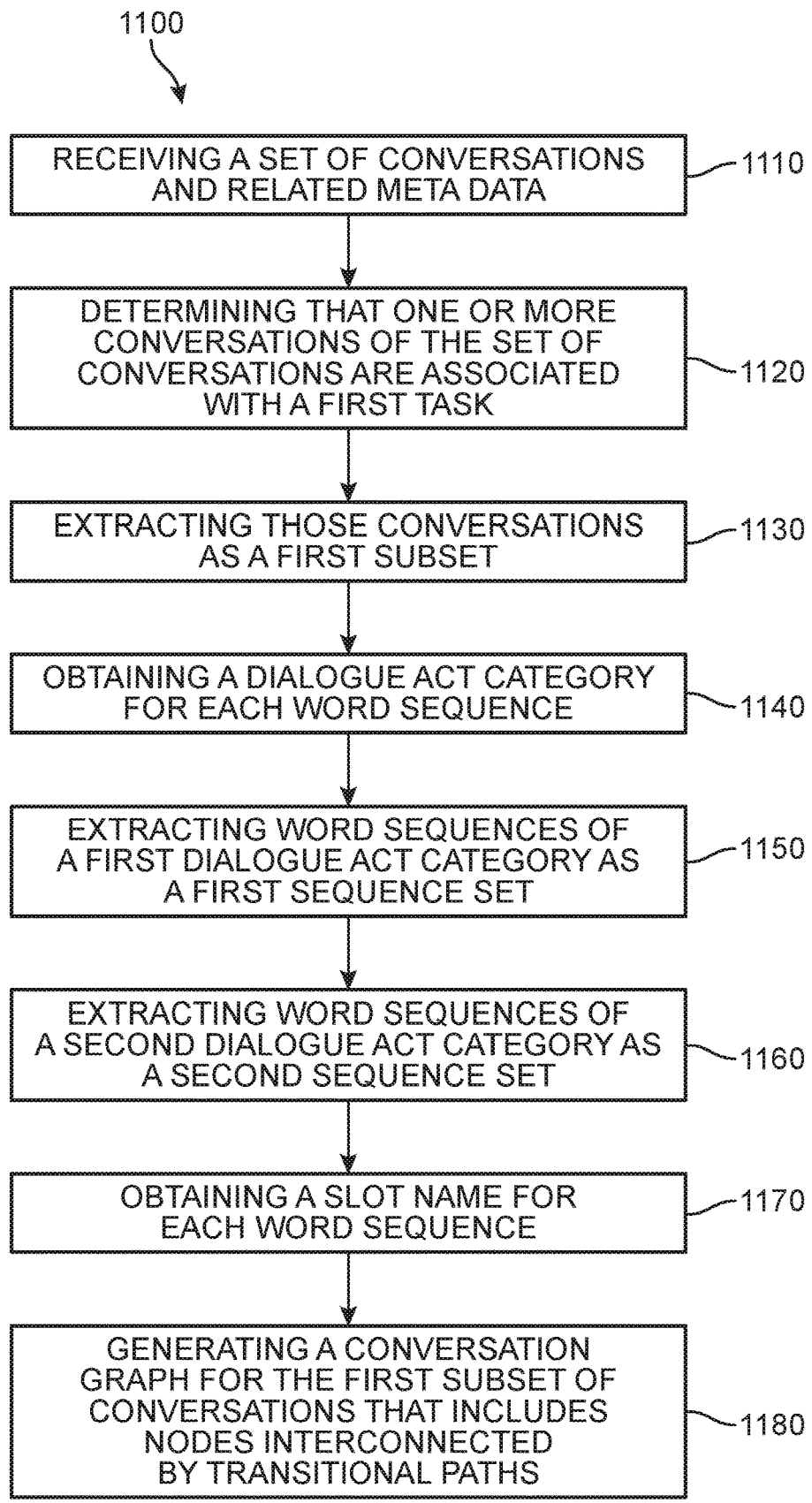
FIG. 11 is a flow chart depicting a method of generating a conversation graph, according to an embodiment.

FIG. 11 is a flow chart illustrating an embodiment of a method 1100 of generating a conversation graph for the representation of a task. As shown in FIG. 11, a first step 1110 of the method 1100 includes receiving a set of conversations and related meta data. In this case, each conversation includes a plurality of word sequences that each comprise a plurality of words, and each word sequence corresponds to an utterance by either an agent or a user during that conversation. In a second step 1120, the method determines that one or more conversations of the set of conversations are associated with a first task. In other words, the conversations matching a selected intent are identified. A third step 1130 includes extracting the one or more conversations associated with the first task from the set of conversations as a first subset. A fourth step 1140 includes obtaining a dialogue act category (DAC) for each word sequence associated with an agent, a user, or a combination of both, in each conversation of the first subset based on a type of communication expressed by the word sequence. In a fifth step 1150, the method includes extracting those word sequences classified under a first dialogue act category from the first subset as a first sequence set, and a sixth step 1160 includes extracting those word sequences classified under a second dialogue act category from the first subset as a second sequence set. A seventh step 1170 includes obtaining a slot name for each word sequence in both the first sequence set and the second sequence set based on a semantic content of the word sequence. Furthermore, an eighth step 1180 includes the automatic generation of a conversation graph for the first subset of conversations. The conversation graph includes a plurality of nodes interconnected by a series of transitional paths or edges. In addition, the plurality of nodes include a first node group and a second node group, where each node of the first node group represents all word sequences that were assigned the same slot name in the first sequence set (e.g. information seeking nodes), and each node of the second node group represents all word sequences that were assigned the same slot name in the second sequence set (e.g., resolution nodes).

In other embodiments, the method may include additional steps or aspects. For example, the method can further include determining, for a first conversation, that a first word sequence corresponding to a first agent utterance classified under the first dialogue act category and assigned a first slot name is immediately followed by a second word sequence corresponding to a first user utterance, and that the second word sequence is immediately followed by a third word sequence corresponding to a second agent utterance classified under the second dialogue act category and assigned a second slot name. In such cases, the conversation graph includes a first transitional path connecting a first node representing at least the first word sequence to a second node representing at least the third word sequence.

In another embodiment, the method further includes determining, for a second conversation, that a fourth word sequence corresponding to third agent utterance classified under the first dialogue act category and assigned the first slot name is immediately followed by a fifth word sequence corresponding to a second user utterance, and that the fifth word sequence is immediately followed by a sixth word sequence corresponding to a fourth agent utterance classified under the second dialogue act category and assigned a third slot name. In such cases, the conversation graph includes a second transitional path connecting the first node representing both the first word sequence and the fourth word sequence to a third node representing at least the sixth word sequence.

In some embodiments, each conversation of the first subset is represented in the conversation graph by a conversation path sequence that includes at least an initial node and a final node. In such cases, the method can further involve assigning a first conversation end type to conversation path sequences with a final node indicating a resolution that was confirmed by a user, and assigning a second conversation end type to conversation path sequences with a final node indicating a creation of a service request. In one implementation, the method may also include assigning a third conversation end type to conversation path sequences with a final node indicating a user left the conversation without responding to an agent's question.

In another embodiment, the method can also involve processing all conversation path sequences in the conversation graph through a neural network to generate a knowledge base, and then receiving, during a real-time conversation between an agent and a customer, a first agent utterance and a subsequent customer utterance. In addition, the method can include determining that a first node in the conversation graph would represent the first agent utterance, and processing a content of the first node and the first customer utterance through the neural network to generate a predictive output identifying a next most likely node based on the knowledge base. The method can further include steps of selecting a word sequence that is represented by the next most likely node, and automatically presenting, to the customer, a second agent utterance based on the selected word sequence.

In some other examples, word sequences that include questions are classified under the first dialogue act category and word sequences that include information or commands (providing resolutions to a customer) are classified under the second dialogue act category. In another example, the first node represents at least two word sequences from two different conversations that were both classified under the first dialogue act category and assigned the first slot name. In some cases, the first transitional path has a thickness that increases in accordance with an increase in number of word sequences being represented by either the first node or the second node, while in other cases, each node of the plurality of nodes is a selectable option in the conversation graph for displaying all word sequences represented by the selected node.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of generating a conversation graph for representation of a task, the method comprising:
   receiving a set of conversations and related meta data, wherein each conversation includes a plurality of word sequences that each comprise a plurality of words, each word sequence corresponding to an utterance by either an agent or a user;
   determining that one or more conversations of the set of conversations are associated with a first task;
   extracting the one or more conversations associated with the first task from the set of conversations as a first subset;
   obtaining a dialogue act category for each word sequence associated with an agent, a user, or a combination of both, in each conversation of the first subset based on a type of communication expressed by the word sequence;
   extracting those word sequences classified under a first dialogue act category from the first subset as a first sequence set;
   extracting those word sequences classified under a second dialogue act category from the first subset as a second sequence set;
   obtaining a slot name for each word sequence in both the first sequence set and the second sequence set based on a semantic content of the word sequence; and
   generating a conversation graph for the first subset of conversations, the conversation graph including a plurality of nodes interconnected by a series of transitional paths, the plurality of nodes including a first node group and a second node group, wherein each node of the first node group represents each collection of word sequences that were assigned the same slot name in the first sequence set, and each node of the second node group represents each collection of word sequences that were assigned the same slot name in the second sequence set.

2. The method of claim 1, wherein word sequences including questions are classified under the first dialogue act category and word sequences including information or commands providing resolutions to a customer are classified under the second dialogue act category.

3. The method of claim 1, further comprising:
   determining, for a first conversation, that a first word sequence corresponding to a first agent utterance classified under the first dialogue act category and assigned a first slot name is immediately followed by a second word sequence corresponding to a first user utterance, and that the second word sequence is immediately followed by a third word sequence corresponding to a second agent utterance classified under the second dialogue act category and assigned a second slot name; and
   wherein the conversation graph includes a first transitional path connecting a first node representing at least the first word sequence to a second node representing at least the third word sequence.

4. The method of claim 3, wherein the first node represents at least two word sequences from two different conversations that were both classified under the first dialogue act category and assigned the first slot name.

5. The method of claim 4, wherein the first transitional path has a thickness that increases in accordance with an increase in number of word sequences being represented by either the first node or the second node.

6. The method of claim 1, wherein each node of the plurality of nodes is a selectable option in the conversation graph for displaying all word sequences represented by the selected node.

7. The method of claim 3, further comprising:
determining, for a second conversation, that a fourth word sequence corresponding to third agent utterance classified under the first dialogue act category and assigned the first slot name is immediately followed by a fifth word sequence corresponding to a second user utterance, and that the fifth word sequence is immediately followed by a sixth word sequence corresponding to a fourth agent utterance classified under the second dialogue act category and assigned a third slot name; and
wherein the conversation graph includes a second transitional path connecting the first node representing both the first word sequence and the fourth word sequence to a third node representing at least the sixth word sequence.

8. The method of claim 1, wherein each conversation of the first subset is represented in the conversation graph by a conversation path sequence that includes at least an initial node and a final node, and wherein the method further comprises:
assigning a first conversation end type to conversation path sequences with a final node indicating a resolution that was confirmed by a user; and
assigning a second conversation end type to conversation path sequences with a final node indicating a creation of a service request.

9. The method of claim 8, further comprising assigning a third conversation end type to conversation path sequences with a final node indicating a user left the conversation without responding to an agent's question.

10. The method of claim 1, further comprising:
processing all conversation path sequences in the conversation graph through a neural network to generate a knowledge base;
receiving, during a real-time conversation between an agent and a customer, a first agent utterance and a subsequent customer utterance;
determining that a first node in the conversation graph would represent the first agent utterance;
processing a content of the first node and the first customer utterance through the neural network to generate a predictive output identifying a next most likely node based on the knowledge base;
selecting a word sequence that is represented by the next most likely node; and
automatically presenting, to the customer, a second agent utterance based on the selected word sequence.

11. A system for generating a graph representing information about a group of related conversations, the system comprising:
a processor;
machine-readable media including instructions which, when executed by the processor, cause the processor to:
receive a set of conversations and related meta data, wherein each conversation includes a plurality of word sequences that each comprise a plurality of words, each word sequence corresponding to an utterance by either an agent or a user;
determine that one or more conversations of the set of conversations are associated with a first task;
extract the one or more conversations associated with the first task from the set of conversations as a first subset;
obtain a dialogue act category for each word sequence associated with an agent, a user, or a combination of both, in each conversation of the first subset based on a type of communication expressed by the word sequence;
extract those word sequences classified under a first dialogue act category from the first subset as a first sequence set;
extract those word sequences classified under a second dialogue act category from the first subset as a second sequence set;
obtain a slot name for each word sequence in both the first sequence set and the second sequence set based on a semantic content of the word sequence; and
generate a conversation graph for the first subset of conversations, the conversation graph including a plurality of nodes interconnected by a series of transitional paths, the plurality of nodes including a first node group and a second node group, wherein each node of the first node group represents each collection of word sequences that were assigned the same slot name in the first sequence set, and each node of the second node group represents each collection of word sequences that were assigned the same slot name in the second sequence set.

12. The system of claim 11, wherein word sequences including questions are classified under the first dialogue act category and word sequences including information or commands providing resolutions to a customer are classified under the second dialogue act category.

13. The system of claim 11, wherein the instructions further cause the processor to:
determine, for a first conversation, that a first word sequence corresponding to a first agent utterance classified under the first dialogue act category and assigned a first slot name is immediately followed by a second word sequence corresponding to a first user utterance, and that the second word sequence is immediately followed by a third word sequence corresponding to a second agent utterance classified under the second dialogue act category and assigned a second slot name; and
wherein the conversation graph includes a first transitional path connecting a first node representing at least the first word sequence to a second node representing at least the third word sequence.

14. The system of claim 13, wherein the first node represents at least two word sequences from two different conversations that were both classified under the first dialogue act category and assigned the first slot name.

15. The system of claim 14, wherein the first transitional path has a thickness that increases in accordance with an increase in number of word sequences being represented by either the first node or the second node.

16. The system of claim 11, wherein each node of the plurality of nodes is a selectable option in the conversation graph for displaying all word sequences represented by the selected node.

17. The system of claim 13, wherein the instructions further cause the processor to:
determine, for a second conversation, that a fourth word sequence corresponding to third agent utterance classified under the first dialogue act category and assigned the first slot name is immediately followed by a fifth word sequence corresponding to a second user utterance, and that the fifth word sequence is immediately followed by a sixth word sequence corresponding to a fourth agent utterance classified under the second dialogue act category and assigned a third slot name; and wherein the conversation graph includes a second transitional path connecting the first node representing both the first word sequence and the fourth word sequence to a third node representing at least the sixth word sequence.

18. The system of claim 11, wherein each conversation of the first subset is represented in the conversation graph by a conversation path sequence that includes at least an initial node and a final node, and wherein the instructions further cause the processor to:

assign a first conversation end type to conversation path sequences with a final node indicating a resolution that was confirmed by a user; and assign a second conversation end type to conversation path sequences with a final node indicating a creation of a service request.

19. The system of claim 11, wherein the instructions further cause the processor to:

process all conversation path sequences in the conversation graph through a neural network to generate a knowledge base;

receive, during a real-time conversation between an agent and a customer, a first agent utterance and a subsequent customer utterance;

determine that a first node in the conversation graph would represent the first agent utterance;

process a content of the first node and the first customer utterance through the neural network to generate a predictive output identifying a next most likely node based on the knowledge base;

select a word sequence that is represented by the next most likely node; and automatically present, to the customer, a second agent utterance based on the selected word sequence.

20. A system comprising one or more computers and one or more storage devices storing instructions that are operable, when executed by the one or more computers, to cause the one or more computers to:

receive a set of conversations and related meta data, wherein each conversation includes a plurality of word sequences that each comprise a plurality of words, each word sequence corresponding to an utterance by either an agent or a user;

determine that one or more conversations of the set of conversations are associated with a first task;

extract the one or more conversations associated with the first task from the set of conversations as a first subset;

obtain a dialogue act category for each word sequence associated with an agent, a user, or a combination of both, in each conversation of the first subset based on a type of communication expressed by the word sequence;

extract those word sequences classified under a first dialogue act category from the first subset as a first sequence set;

extract those word sequences classified under a second dialogue act category from the first subset as a second sequence set;

obtain a slot name for each word sequence in both the first sequence set and the second sequence set based on a semantic content of the word sequence; and generate a conversation graph for the first subset of conversations, the conversation graph including a plurality of nodes interconnected by a series of transitional paths, the plurality of nodes including a first node group and a second node group, wherein each node of the first node group represents each collection of word sequences that were assigned the same slot name in the first sequence set, and each node of the second node group represents each collection of word sequences that were assigned the same slot name in the second sequence set.

* * * * *